United States Patent
Kuramitsu et al.

(10) Patent No.: US 11,635,581 B2
(45) Date of Patent: Apr. 25, 2023

(54) OPTICAL FIBER UNIT AND MACHINING METHOD FOR OPTICAL FIBER UNIT

(71) Applicant: Fujikura Ltd., Tokyo (JP)

(72) Inventors: Ryo Kuramitsu, Sakura (JP); Koji Tomikawa, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/297,337

(22) PCT Filed: Nov. 5, 2019

(86) PCT No.: PCT/JP2019/043254
§ 371 (c)(1),
(2) Date: May 26, 2021

(87) PCT Pub. No.: WO2020/161971
PCT Pub. Date: Aug. 13, 2020

(65) Prior Publication Data
US 2022/0026652 A1  Jan. 27, 2022

(30) Foreign Application Priority Data
Feb. 8, 2019 (JP) .............................. JP2019-021789

(51) Int. Cl.
*G02B 6/44* (2006.01)
(52) U.S. Cl.
CPC .................................. *G02B 6/448* (2013.01)
(58) Field of Classification Search
CPC .............................. G02B 6/4403; G02B 6/448
See application file for complete search history.

(56) References Cited

U.S. PATENT DOCUMENTS

2017/0146760 A1   5/2017  Kaji et al.

FOREIGN PATENT DOCUMENTS

| JP | S6198307 A | 5/1986 |
|----|------------|--------|
| JP | 2000121898 A | 4/2000 |
| JP | 2003114359 A | 4/2003 |
| JP | 2005062427 A | 3/2005 |
| JP | 2010008923 A | 1/2010 |
| JP | 2011169940 A | 9/2011 |
| JP | 2011185992 A | 9/2011 |
| JP | 2012027130 A | 2/2012 |

(Continued)

OTHER PUBLICATIONS

Office Action issued in corresponding Taiwanese Patent Application No. 10920965880, dated Oct. 12, 2020 (8 pages).

*Primary Examiner* — Omar R Rojas
(74) *Attorney, Agent, or Firm* — Osha Bergman Watanabe & Burton LLP

(57) ABSTRACT

An optical fiber unit includes: a first optical fiber ribbon that intermittently connects a first plurality of optical fibers; a second optical fiber ribbon that intermittently connects a second plurality of optical fibers; and interlayer connection parts that intermittently connect the first optical fiber ribbon and the second optical fiber ribbon in a length direction while the first optical fiber ribbon and the second optical fiber ribbon are layered and arranged. The first optical fiber ribbon and the second optical fiber ribbon are layered and arranged such that optical fibers having a same fiber number of the first optical fiber ribbon and the second optical fiber ribbon are aligned in a up-down direction perpendicular to the length direction.

12 Claims, 15 Drawing Sheets

(56) References Cited

FOREIGN PATENT DOCUMENTS

| | | | |
|---|---|---|---|
| JP | 2012208223 | A | 10/2012 |
| JP | 2013088617 | A | 5/2013 |
| JP | 2013109172 | A | 6/2013 |
| JP | 2014016528 | A | 1/2014 |
| JP | 2014085592 | A | 5/2014 |
| JP | 2015007714 | A | 1/2015 |
| JP | 2015219355 | A | 12/2015 |
| JP | 2016001338 | A | 1/2016 |
| JP | 2016133606 | A | 7/2016 |
| JP | 2016184170 | A | 10/2016 |
| JP | 2017026754 | A | 2/2017 |
| TW | 201612566 | A | 4/2016 |
| WO | 2017094560 | A1 | 6/2017 |

OPTICAL FIBER UNIT AND MACHINING METHOD FOR OPTICAL FIBER UNIT

TECHNICAL FIELD

The present invention relates to an optical fiber unit and a machining method for an optical fiber unit.

BACKGROUND

Patent Literatures 1 to 6 describe an optical fiber ribbon (intermittently connected optical fiber ribbon) in which three or more-core optical fibers arranged side by side are intermittently connected. Patent Literature 7 describes an optical fiber unit in which a plurality of optical fibers are circularly connected. Patent Literature 8 describes an optical fiber unit in which a plurality of optical fibers are arranged in two lines and many rows and are intermittently connected. Patent Literature 9 describes that a plurality of intermittently connected optical fiber ribbons are aligned in one row on a plane and intermittently connected.

PATENT LITERATURE

Patent Literature 1: JP 2015-219355A
Patent Literature 2: JP 2016-184170A
Patent Literature 3: JP 2017-026754A
Patent Literature 4: JP 2013-088617A
Patent Literature 5: JP 2016-001338A
Patent Literature 6: JP 2010-008923A
Patent Literature 7: JP 2012-208223A
Patent Literature 8: JP 2013-109172A
Patent Literature 9: JP 2014-016528A The optical fiber unit described in Patent Literatures 7 and 8 arranges, in many stages or circularly, a plurality of optical fibers constituting one optical fiber ribbon, and a plurality of optical fiber ribbons are not constituted. The optical fiber unit described in Patent Literatures 7 and 8 is configured to arrange a plurality of optical fibers constituting one optical fiber ribbon in many stages or circularly, and thus it may be difficult to determine a position of a predetermined optical fiber (for example, a first optical fiber).

In the optical fiber unit described in Patent Literature 9, a boundary between an optical fiber ribbon and an optical fiber ribbon needs to be determined by determining a difference in connection pattern. Thus, in the optical fiber unit described in Patent Literature 9, it may be difficult to determine a position of a predetermined optical fiber (for example, a first optical fiber).

SUMMARY

One or more embodiments provide an optical fiber unit that includes a plurality of optical fiber ribbons, and makes it easy to determine a position of a predetermined optical fiber of each of the optical fiber ribbons. One or more embodiments provide a new machining method for such an optical fiber unit.

In one or more embodiments, an optical fiber unit comprises: a first optical fiber ribbon that is an intermittently connected optical fiber ribbon intermittently connecting N optical fibers; a second optical fiber ribbon that is an intermittently connected optical fiber ribbon intermittently connecting N optical fibers; and interlayer connection parts that intermittently connect the first optical fiber ribbon and the second optical fiber ribbon in a length direction while the first optical fiber ribbon and the second optical fiber ribbon are layered and arranged, wherein the first optical fiber ribbon and the second optical fiber ribbon are layered and arranged such that optical fibers having a same fiber number of the first optical fiber ribbon and the second optical fiber ribbon are aligned.

Other features of embodiments of the invention are made clear by the following description and the drawings.

With one or more embodiments of the present invention, it is easy to determine a position of a predetermined optical fiber of each optical fiber ribbon.

DETAILED DESCRIPTION

Figure 1A:
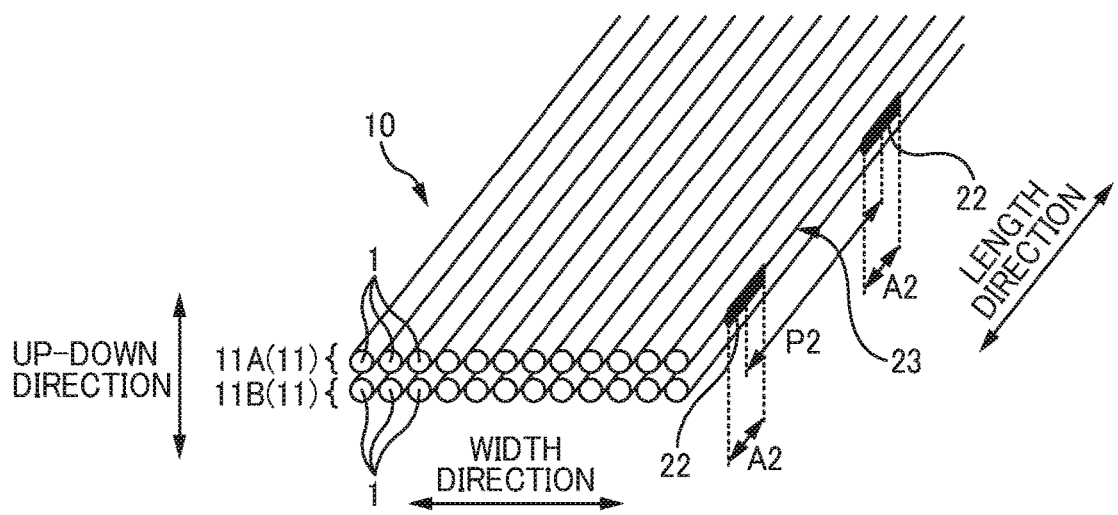
FIG. 1A is an explanatory diagram of an optical fiber unit 10 according to one or more embodiments.

At least the following matters are made clear from the following description and the drawings.

An optical fiber unit will become clear, comprising: a first optical fiber ribbon that is an intermittently connected optical fiber ribbon intermittently connecting N optical fibers; a second optical fiber ribbon that is an intermittently connected optical fiber ribbon intermittently connecting N optical fibers; and interlayer connection parts that intermittently connect the first optical fiber ribbon and the second optical fiber ribbon in a length direction while the first optical fiber ribbon and the second optical fiber ribbon are layered and arranged, wherein the first optical fiber ribbon and the second optical fiber ribbon are layered and arranged such that optical fibers having a same fiber number of the first optical fiber ribbon and the second optical fiber ribbon are aligned. With the optical fiber unit, it is easy to determine a position of a predetermined optical fiber of each optical fiber ribbon.

It is preferable that the optical fiber in an end part of the first optical fiber ribbon and the optical fiber in an end part of the second optical fiber ribbon are connected by the interlayer connection parts. In this way, work for breaking the interlayer connection parts is facilitated.

It is preferable that the interlayer connection parts that connect first optical fibers to each other and the interlayer connection parts that connect N-th optical fibers to each other are formed in a same position in the length direction. In this way, it is easy to maintain a shape of the optical fiber unit.

It is preferable that the interlayer connection parts that connect first optical fibers to each other and the interlayer connection parts that connect N-th optical fibers to each other are formed in different positions from each other in the length direction. In this way, it is possible to maintain a shape of the optical fiber unit by a small number of the interlayer connection parts.

It is preferable that an interval P2 is longer than an interval P1, where P1 is an interval in which in-layer connection parts that each intermittently connects the optical fibers of the first optical fiber ribbon or the second optical fiber ribbon are aligned in the length direction, and P2 is an interval in which the interlayer connection parts are aligned in the length direction. In this way, it is easy to widen a separation part (interlayer separation part) between the first optical fiber ribbon and the second optical fiber ribbon of the optical fiber unit.

It is preferable that a length A2 is shorter than a length A1, where A1 is a length in the length direction of an in-layer connection part that intermittently connects the optical fibers of the first optical fiber ribbon or the second optical fiber ribbon, and A2 is a length in the length direction of the interlayer connection part. In this way, it is easy to break the interlayer connection part while the in-layer connection part is maintained.

It is preferable that the interlayer connection parts are formed on a layer of a connection agent constituting in-layer connection parts that intermittently connect the optical fibers of the first optical fiber ribbon or the second optical fiber ribbon. It is easy to break the interlayer connection part while the in-layer connection part remains.

It is preferable that in-layer connection parts that intermittently connect the optical fibers of the first optical fiber ribbon or the second optical fiber ribbon are not formed in a section in which the interlayer connection parts of the optical fibers are formed. In this way, it is possible to suppress a transmission loss.

The optical fiber unit preferably, further comprises a third optical fiber ribbon that is an intermittently connected optical fiber ribbon that intermittently connects N optical fibers, wherein interlayer connection parts that intermittently connect the first optical fiber ribbon and the second optical fiber ribbon in the length direction and interlayer connection parts that intermittently connect the second optical fiber ribbon and the third optical fiber ribbon in the length direction are formed in a same position in the length direction. In this way, it is easy to form two interlayer connection parts aligned in an up-down direction.

The optical fiber unit preferably, further comprises a third optical fiber ribbon that is an intermittently connected optical fiber ribbon intermittently connecting N optical fibers, wherein interlayer connection parts that intermittently connect the first optical fiber ribbon and the second optical fiber ribbon in the length direction and interlayer connection parts that intermittently connect the second optical fiber ribbon and the third optical fiber ribbon in the length direction are formed in different positions from each other in the length direction. It is possible to perform an arrangement such that a position in the length direction of a separation part (interlayer separation part) between the first optical fiber ribbon and the second optical fiber ribbon is shifted with respect to a position in the length direction of a separation part (interlayer separation part) between the second optical fiber ribbon and the third optical fiber ribbon, and thus work for taking out a desired optical fiber ribbon from the optical fiber unit is facilitated.

A machining method for an optical fiber unit will become clear, the machining method comprising: preparing an optical fiber unit in which a first optical fiber ribbon that is an intermittently connected optical fiber ribbon and a second optical fiber ribbon that is an intermittently connected optical fiber ribbon which are layered and arranged are intermittently connected in a length direction by interlayer connection parts; opening up a separation part between the first optical fiber ribbon and the second optical fiber ribbon by applying force in the length direction to the optical fiber unit to reduce an interval between the interlayer connection parts; and breaking the interlayer connection parts by inserting a finger or a division tool into the opened separation part. With such a machining method, work for breaking the interlayer connection part of the optical fiber unit is facilitated.

A machining method for an optical fiber unit will become clear, the machining method comprising: preparing an optical fiber unit in which a first optical fiber ribbon that is an intermittently connected optical fiber ribbon and a second optical fiber ribbon that is an intermittently connected optical fiber ribbon which are layered and arranged are intermittently connected in a length direction by interlayer connection parts; separating a plurality of optical fibers of the first optical fiber ribbon and a plurality of optical fibers of the second optical fiber ribbon into single fibers in an end part of the optical fiber unit; and arranging the plurality of optical fibers in one row by setting the optical fiber unit in a holder including a base part and a lid part, and sandwiching the plurality of layered and arranged optical fibers of the optical fiber unit between the base part and the lid part. With such a machining method, it is possible to machine the optical fibers of the optical fiber unit by using a normal tool.

The machining method for an optical fiber unit preferably, further comprising: setting, in a sheath removing device, the holder in which the plurality of optical fibers of the optical fiber unit are arranged in one row; and removing sheaths of the plurality of optical fibers of the first optical fiber ribbon and sheaths of the plurality of optical fibers of the second optical fiber ribbon together by a pair of blades of the sheath removing device. In this way, it is possible to line up peeling edges of the sheaths.

The machining method for an optical fiber unit preferably, further comprising: setting, in a cutting device, the holder in which the plurality of optical fibers of the optical fiber unit are arranged in one row; and cutting the plurality of optical fibers of the first optical fiber ribbon and the plurality of optical fibers of the second optical fiber ribbon together by moving a cutting blade of the cutting device in a direction in which the plurality of optical fibers are aligned. In this way, it is possible to line up endfaces of the optical fibers.

Figure 1B:
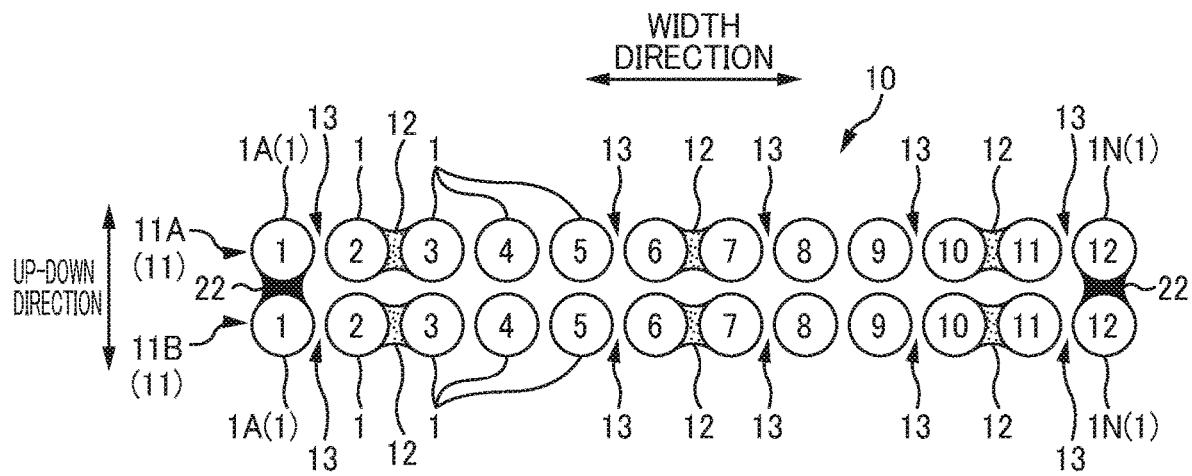
FIG. 1B is a cross-sectional view in a position including an interlayer connection part 22.
Figure 1C:
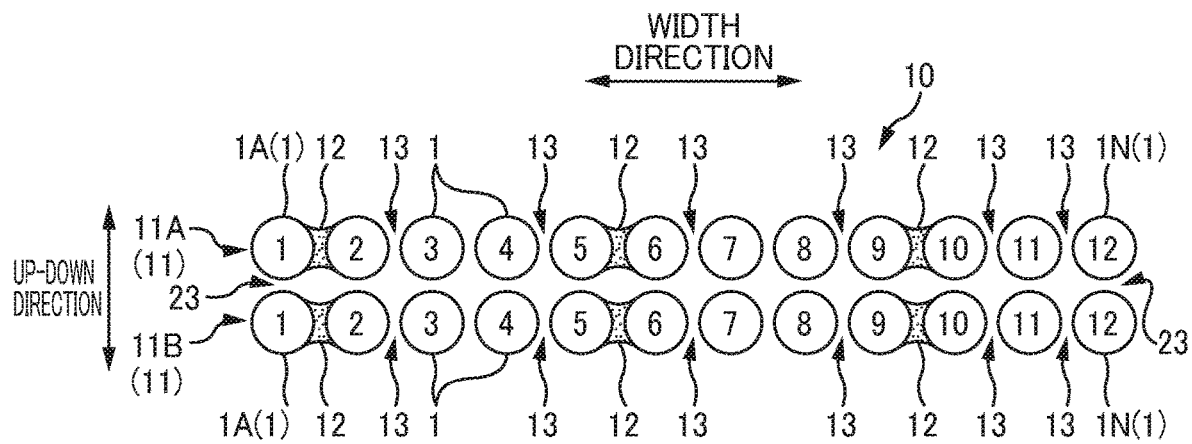
FIG. 1C is a cross-sectional view in a position that does not include the interlayer connection part 22.

Optical Fiber Unit 10:

FIG. 1A is an explanatory diagram of an optical fiber unit 10 according to one or more embodiments. FIG. 1B is a cross-sectional view in a position including an interlayer connection part 22. FIG. 1C is a cross-sectional view in a position that does not include the interlayer connection part 22. FIGS. 1B and 1C illustrate an identification number (fiber number) of an optical fiber 1 inside a circle indicating the optical fiber 1.

In the following description, a direction parallel to an optical axis direction of the optical fiber 1 may be referred to as a "length direction". A direction in which a plurality of (here 12) optical fibers 1 constituting each intermittently connected optical fiber ribbon 11 (a first tape 11A or a second tape 11B) are aligned may be referred to as a "width direction". A direction in which the two intermittently connected optical fiber ribbons 11 (the first tape 11A and the second tape 11B) are aligned may be referred to as an "up-down direction".

The optical fiber unit 10 according to one or more embodiments includes two intermittently connected optical fiber ribbons 11. The two intermittently connected optical fiber ribbons 11 are aligned in the up-down direction. In other words, the two intermittently connected optical fiber ribbons 11 are layered and arranged with tape surfaces facing each other. In the following description, one of the intermittently connected optical fiber ribbons 11 may be referred to as the "first tape 11A", and the other intermittently connected optical fiber ribbon 11 adjacent to the first tape 11A may be referred to as the "second tape 11B". Note that, when each of the plurality of intermittently connected optical fiber ribbons 11 constituting the optical fiber unit 10 is provided with a tape number, a first tape is the first tape 11A, and a second tape is the second tape 11B.

Each of the intermittently connected optical fiber ribbons 11 (the first tape 11A or the second tape 11B) includes a plurality of (N) optical fibers 1. In one or more embodiments, each of the intermittently connected optical fiber ribbons 11 (the first tape 11A or the second tape 11B) includes 12 optical fibers 1. In other words, the intermittently connected optical fiber ribbon 11 according to one or more embodiments is an N-core optical fiber ribbon. The plurality of optical fibers 1 constituting the intermittently connected optical fiber ribbon 11 are each provided with a fiber number. In a case of the N-core optical fiber ribbon, the N optical fibers 1 from a first fiber 1A to an N-th fiber 1N are aligned in order in the width direction. Note that a configuration of the intermittently connected optical fiber ribbon 11 will be described later.

In one or more embodiments, the two intermittently connected optical fiber ribbons 11 are aligned in the up-down direction such that the optical fibers 1 having the same fiber number are aligned in the up-down direction. For example, the first fiber 1A of the first tape 11A and the first fiber 1A of the second tape 11B are aligned in the up-down direction. In this way, the optical fibers 1 having the same fiber number are aligned in the up-down direction, and thus it is easy to determine a position of a predetermined optical fiber 1 (for example, the first fiber 1A), and handling of the optical fiber 1 is facilitated.

The first tape 11A and the second tape 11B are intermittently connected by an interlayer connection part 22. The interlayer connection part 22 is a section that connects the two intermittently connected optical fiber ribbons 11 adjacent to each other in the up-down direction. The interlayer connection part 22 may be referred to as a "tape connection part" or a "second connection part". The plurality of interlayer connection parts 22 are arranged intermittently in the length direction. In other words, the plurality of interlayer connection parts 22 are arranged at an interval. An interlayer separation part 23 is formed between the interlayer connection part 22 and the interlayer connection part 22 intermittently arranged in the length direction. Thus, the interlayer connection part 22 and the interlayer separation part 23 are alternately arranged in the length direction. In the interlayer separation part 23, the two intermittently connected optical fiber ribbons 11 adjacent to each other are not connected. In other words, in the interlayer separation part 23, the two intermittently connected optical fiber ribbons 11 adjacent to each other are not restrained.

The interlayer connection part 22 is formed by curing an adhesive. For example, the interlayer connection part 22 is formed by, after application of ultraviolet curing resin to serve as an adhesive, curing the ultraviolet curing resin by irradiation with ultraviolet rays. Note that the interlayer connection part 22 may be formed of thermoplastic resin.

As described above, in one or more embodiments, while the first tape 11A and the second tape 11B are layered and arranged such that the optical fibers 1 having the same fiber number of the first tape 11A and the second tape 11B are aligned, the first tape 11A and the second tape 11B are intermittently connected by the interlayer connection part 22 in the length direction. In this way, it is easy to determine a position of a predetermined optical fiber of each optical fiber ribbon 11. Thus, handling of the multitude of optical fibers 1 of the optical fiber unit 10 is facilitated.

In one or more embodiments, the interlayer connection part 22 is formed in an end part in the width direction. When end parts in the width direction of the plurality of N-core intermittently connected optical fiber ribbons 11 are connected, the interlayer connection part 22 in one of the end parts in the width direction connects the first fibers 1A, and the interlayer connection part 22 in the other end part in the width direction connects the N-th fibers 1N. In one or more embodiments, since the optical fiber unit 10 is formed of the two 12-core intermittently connected optical fiber ribbons 11, the interlayer connection part 22 in one of the end parts connects the first fiber 1A of the first tape 11A and the first fiber 1A of the second tape 11B, and the interlayer connection part 22 in the other end part (on an opposite side) also connects a twelfth fiber 1N of the first tape 11A and a twelfth fiber 1N of the second tape. Note that the interlayer connection part 22 may be formed on the inside in the width direction.

As described above, in one or more embodiments, since the interlayer connection part 22 is formed only in the end part in the width direction, the two optical fiber ribbons 11 adjacent to each other in the up-down direction are restrained only in the end part in the width direction and are not restrained in a central part in the width direction. In this way, it is easy to roll up the optical fiber unit 10 into a bundle, and it is easy to bundle the multitude of optical fibers 1 with high density into an optical cable. In one or more embodiments, since the interlayer connection part 22 is formed only in the end part in the width direction, work for breaking the interlayer connection part 22 is facilitated when the intermittently connected optical fiber ribbon 11 is taken out from the optical fiber unit 10. However, optical fibers other than an end part may be connected to each other by the interlayer connection part 22.

In one or more embodiments, as illustrated in FIG. 1B, the interlayer connection part 22 that connects the first fibers 1A to each other and the interlayer connection part that connects the N-th fibers 1N to each other are formed in the same position in the length direction. In this way, it is easy to maintain a shape of the optical fiber unit 10. However, the interlayer connection part 22 that connects the first fibers 1A to each other and the interlayer connection part 22 that connects the N-th fibers 1N to each other may be formed in different positions (for example, in alternate positions) in the length direction. In this way, a shape of the optical fiber unit 10 can be maintained by a small number of the interlayer connection parts 22.

Figure 2:
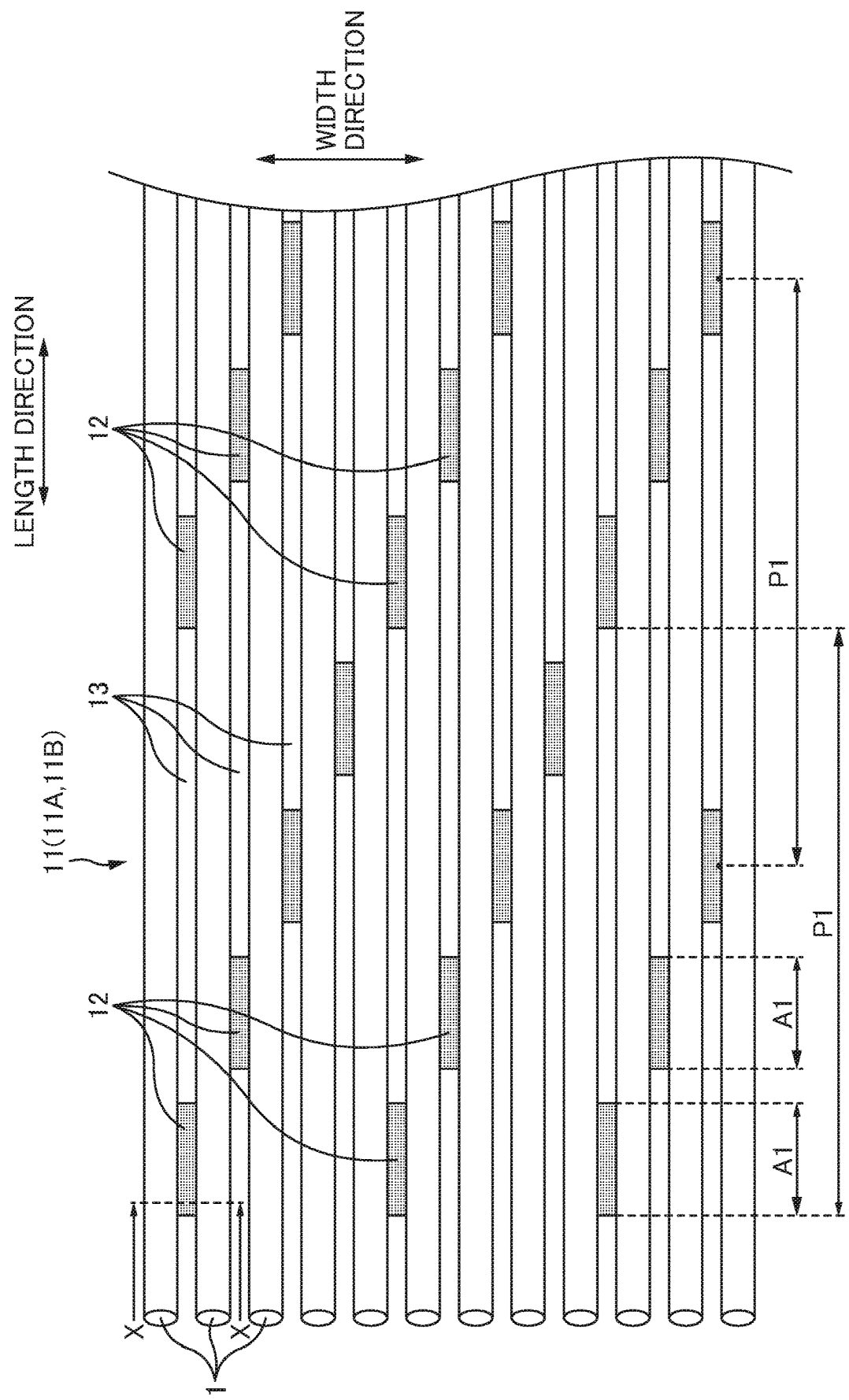
FIG. 2 is an explanatory diagram of an intermittently connected optical fiber ribbon 11 in which single-core fibers are intermittently connected.

FIG. 2 is an explanatory diagram of the intermittently connected optical fiber ribbon 11 in which single-core fibers are intermittently connected.

The intermittently connected optical fiber ribbon 11 is an optical fiber ribbon including the plurality of optical fibers 1 arranged side by side and connected intermittently. Two optical fibers 1 adjacent to each other are connected by an in-layer connection part 12. The in-layer connection part 12 is a section that connects the two optical fibers 1 adjacent to each other in the width direction. Note that the in-layer connection part 12 may be referred to as a "fiber connection part" or a "first connection part". The plurality of in-layer connection parts 12 are arranged intermittently and two-dimensionally in the length direction and the width direction. The plurality of in-layer connection parts 12 are arranged intermittently in the length direction between the two optical fibers 1 adjacent to each other. A non-connected part 13 (separation part) is formed between the in-layer connection part 12 and the in-layer connection part 12 intermittently arranged in the length direction. Thus, the in-layer connection part 12 and the non-connected part 13 are alternately arranged in the length direction. In the non-connected part 13, the two optical fibers 1 adjacent to each other are not restrained. The non-connected part 13 is arranged in the width direction of a position in which the in-layer connection part 12 is formed. In this way, the intermittently connected optical fiber ribbon 11 can be rolled up into a bundle, and the multitude of optical fibers 1 can be bundled with high density into an optical cable.

The in-layer connection part 12 is formed by curing an adhesive. For example, the in-layer connection part 12 is formed by, after application of ultraviolet curing resin to serve as an adhesive, curing the ultraviolet curing resin by irradiation with ultraviolet rays. Note that the in-layer connection part 12 may be formed of thermoplastic resin.

Figure 3:
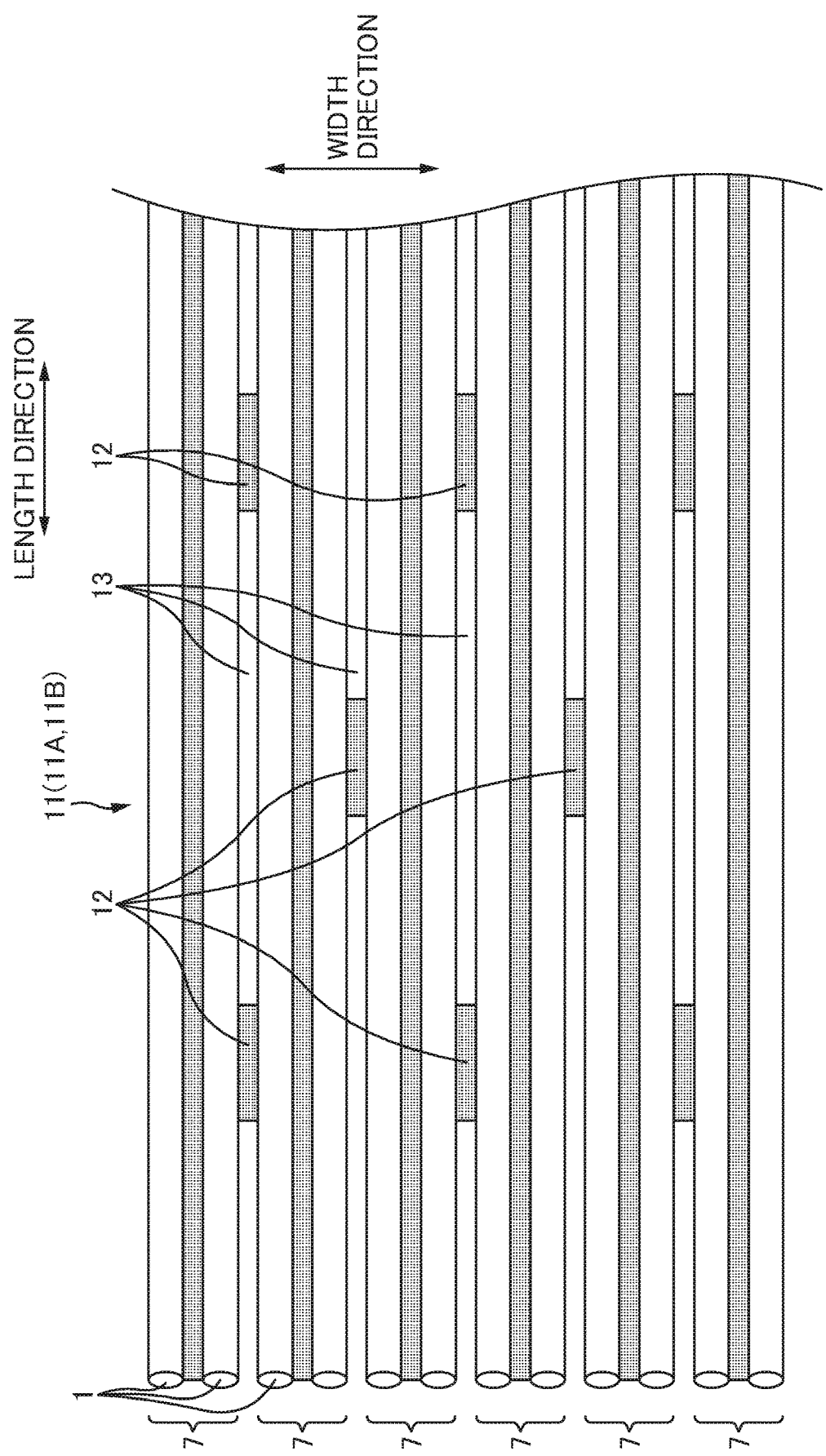
FIG. 3 is an explanatory diagram of another intermittently connected optical fiber ribbon 11.

FIG. 3 is an explanatory diagram of another intermittently connected optical fiber ribbon 11. The optical fiber ribbon 11 includes a plurality of (here six) pairs (fiber pairs 7) of two-line optical fibers 1 continuously connected in the length direction, and the fiber pairs 7 adjacent to each other are intermittently connected by the in-layer connection part 12. In the intermittently connected optical fiber ribbon 11, the non-connected part 13 is arranged in the width direction of a position in which the in-layer connection part 12 is formed. In this way, the optical fiber ribbon 11 can be rolled up into a bundle. Also in the intermittently connected optical fiber ribbon 11, the plurality of in-layer connection parts 12 that connect the fiber pairs 7 adjacent to each other are intermittently arranged in the length direction, and the non-connected part 13 is formed between the in-layer connection part 12 and the in-layer connection part 12. In other words, also in the intermittently connected optical fiber ribbon 11, the in-layer connection part 12 and the non-connected part 13 are alternately arranged in the length direction.

Note that the intermittently connected optical fiber ribbon 11 is not limited to that illustrated in FIGS. 2 and 3. For example, the arrangement of the in-layer connection part 12 may be changed, and the number of the optical fibers 1 may be changed.

Figure 4A:
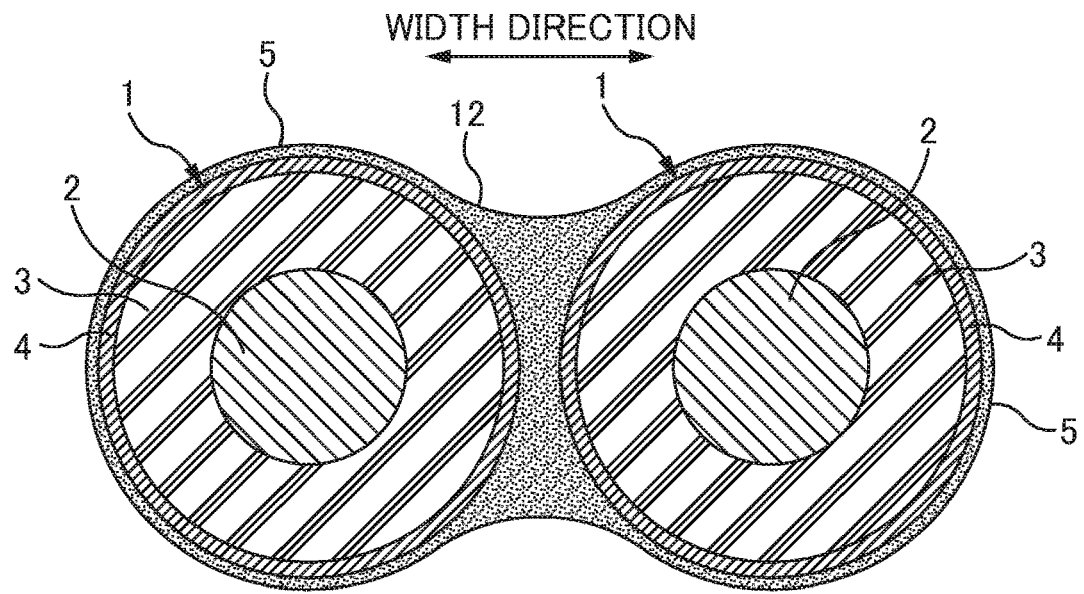
FIG. 4A is a cross-sectional view of two optical fibers 1 connected by an in-layer connection part 12.

FIG. 4A is a cross-sectional view of two optical fibers 1 connected by the in-layer connection part 12. Note that FIG. 4A is also a cross-sectional view taken along a line X-X in FIG. 2.

Each of the optical fibers 1 is formed of an optical fiber part 2, a sheath layer 3, and a colored layer 4. The optical fiber part 2 is formed of a core and a clad. A diameter (clad diameter) of the optical fiber part 2 is, for example, about 125 μm. The sheath layer 3 is a layer for coating the optical fiber part 2. The sheath layer 3 is formed of, for example, a primary sheath layer (primary coating) and a secondary sheath layer (secondary coating). The colored layer 4 is a layer formed on a surface of the sheath layer 3. The colored layer 4 is formed by applying a coloring material to the surface of the sheath layer 3. A marking may be formed between the sheath layer 3 and the colored layer 4. A first adhesive layer 5 is formed on a surface of the colored layer 4. The first adhesive layer is a layer formed by applying, to the surface of the colored layer 4, a connection agent (ultraviolet curing resin) that forms the in-layer connection part 12, and curing the connection agent. Note that, when the plurality of optical fibers 1 constituting the intermittently connected optical fiber ribbon 11 are separated into single fibers, the in-layer connection part 12 is broken, and the first adhesive layer 5 is also peeled from the colored layer 4.

Figure 4B:
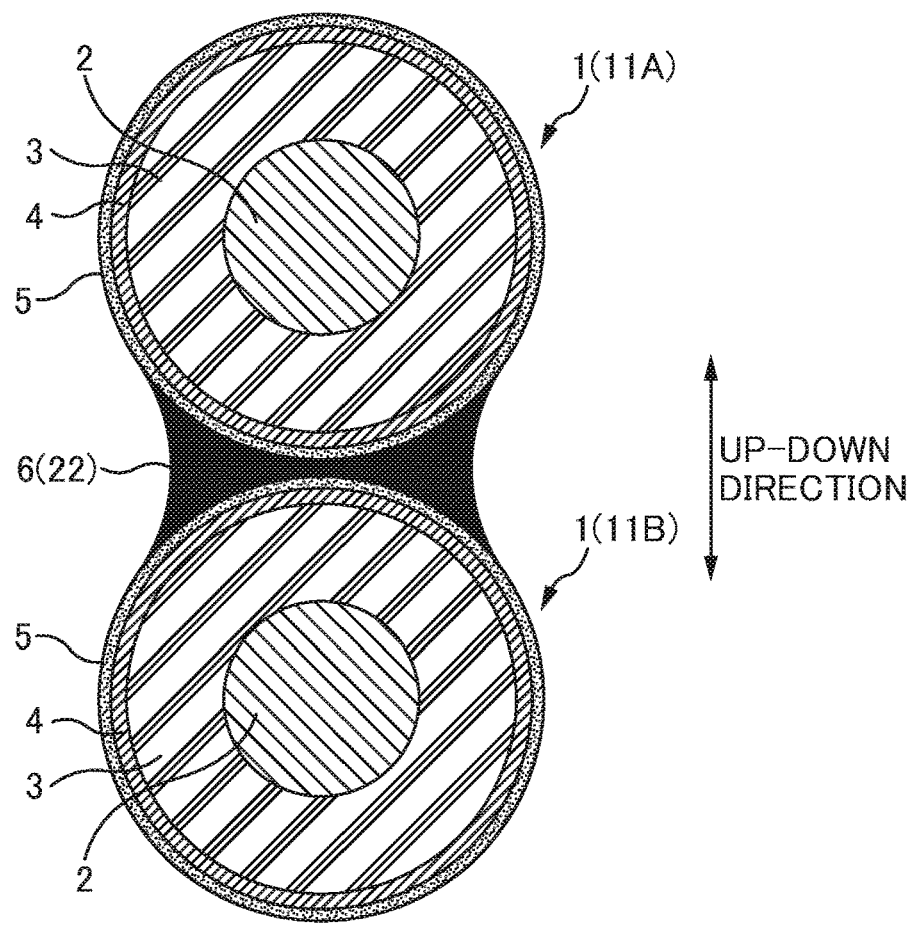
FIG. 4B is a cross-sectional view of two optical fibers 1 connected by the interlayer connection part 22.

FIG. 4B is a cross-sectional view of two optical fibers 1 connected by the interlayer connection part 22.

Each of the optical fibers 1 is formed of the optical fiber part 2, the sheath layer 3, and the colored layer 4. The first adhesive layer 5 is formed on the surface of the colored layer 4. A second adhesive layer (interlayer connection part 22) is formed on a surface of the first adhesive layer 5 between the two optical fibers 1. The second adhesive layer (interlayer connection part 22) is a layer formed by applying, to the surface of the first adhesive layer 5, a connection agent (ultraviolet curing resin) that forms the interlayer connection part 22, and curing the connection agent. Note that, when the plurality of optical fiber ribbons 11 constituting the optical fiber unit 10 are separated, the interlayer connection part 22 is broken.

In one or more embodiments, as illustrated in FIG. 4B, the interlayer connection part 22 is formed to a peripheral side than the in-layer connection part 12. In other words, the interlayer connection part 22 is formed on the first adhesive layer 5 constituting the in-layer connection part 12. In this way, it is easy to break the interlayer connection part 22 while the in-layer connection part 12 remains. As a result, when the intermittently connected optical fiber ribbon 11 is taken out from the optical fiber unit 10, the in-layer connection part 12 is maintained even with the interlayer connection part 22 being broken, and thus a shape of the intermittently connected optical fiber ribbon 11 can be maintained.

In the following description, as illustrated in FIG. 2, it is assumed that an interval between the in-layer connection parts 12 aligned in the length direction (or a distance between centers of the in-layer connection parts 12 in the length direction) is P1, and a length of the in-layer connection part 12 is A1. As illustrated in FIG. 1A, it is assumed that an interval between the interlayer connection parts 22 aligned in the length direction (or a distance between centers of the interlayer connection parts in the length direction) is P2, and a length of the interlayer connection part 22 is A2.

Figure 5A:
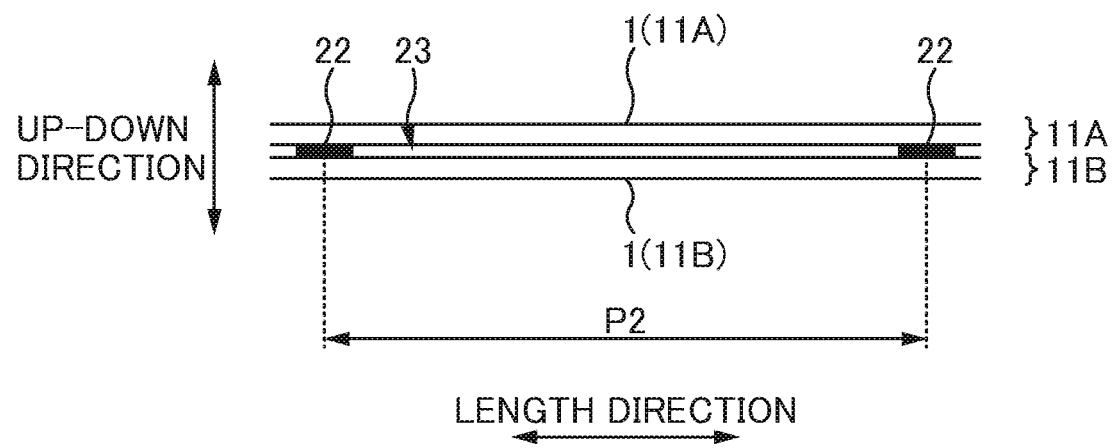
FIG. 5A is an explanatory diagram of an optical fiber unit 10 according to one or more embodiments when viewed from a width direction.
Figure 5B:
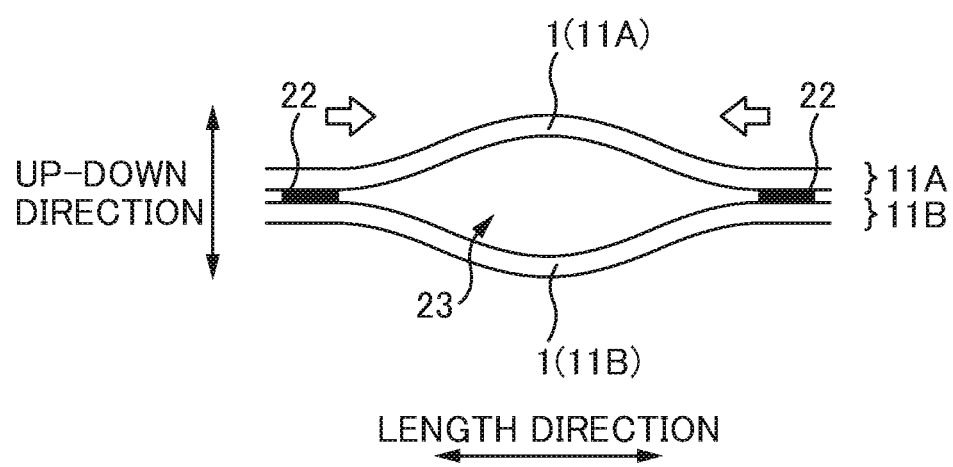
FIG. 5B is an explanatory diagram of a situation where an interlayer separation part 23 of a first tape 11A and a second tape 11B is opened up.

FIG. 5A is an explanatory diagram of the optical fiber unit 10 according to one or more embodiments when viewed from the width direction. FIG. 5B is an explanatory diagram of a situation where the interlayer separation part 23 of the first tape 11A and the second tape 11B is opened up.

In one or more embodiments, the interval P2 between the interlayer connection parts 22 is longer than the interval P1 between the in-layer connection parts 12. In this way, as illustrated in FIG. 5B, the interlayer separation part 23 of the first tape 11A and the second tape 11B can be opened up by applying force in the length direction to the optical fiber unit 10 so as to reduce the interval P2 between the interlayer connection parts 22.

When the optical fiber ribbon 11 is taken out from the optical fiber unit 10, a finger or a division tool is inserted into the interlayer separation part 23, and the inserted finger or the inserted division tool is made to slide in the length direction, and thus the interlayer connection part 22 is broken (cut). In this way, when the optical fiber ribbon 11 is taken out from the optical fiber unit 10, the interlayer separation part 23 of the first tape 11A and the second tape 11B of the optical fiber unit 10 can be widened as illustrated in FIG. 5B, which makes it easy to insert a finger or a division tool into the interlayer separation part 23, and is thus convenient. Thus, it is preferable that the interval P2 between the interlayer connection parts 22 is longer than the interval P1 between the in-layer connection parts 12. In other words, it is preferable that P2>P1.

In one or more embodiments, the length A2 of the interlayer connection part 22 is shorter than the length A1 of the in-layer connection part 12. In this way, it is easier to break the interlayer connection part 22 than the in-layer connection part 12. As a result, when the intermittently connected optical fiber ribbon 11 is taken out from the optical fiber unit 10, it is easy to break the interlayer connection part 22 while the in-layer connection part 12 is maintained, and thus it is easy to maintain a shape of the intermittently connected optical fiber ribbon 11.

In one or more embodiments, as illustrated in FIG. 1B, the interlayer connection part 22 is not formed in a section in which the in-layer connection part 12 of the optical fiber 1 at the end part is formed. In other words, in one or more embodiments, the in-layer connection part 12 is not formed in a section in which the interlayer connection part 22 of the optical fiber 1 in the end part is formed. In other words, in one or more embodiments, the interlayer connection part 22 and the in-layer connection part 12 are not formed in the same section of the optical fiber 1. Note that, if the interlayer connection part 22 and the in-layer connection part 12 are formed in the same section of the optical fiber 1, there is a possibility that the optical fiber 1 may receive lateral pressure in the section in a concentrated manner, and a transmission loss may increase. In contrast, in one or more embodiments, the interlayer connection part 22 and the in-layer connection part 12 are not formed in the same section of the optical fiber 1, and thus lateral pressure applied to a specific section of the optical fiber 1 in a concentrated manner can be suppressed, and a transmission loss can be suppressed.

Method for Manufacturing Optical Fiber Unit 10

Figure 6:
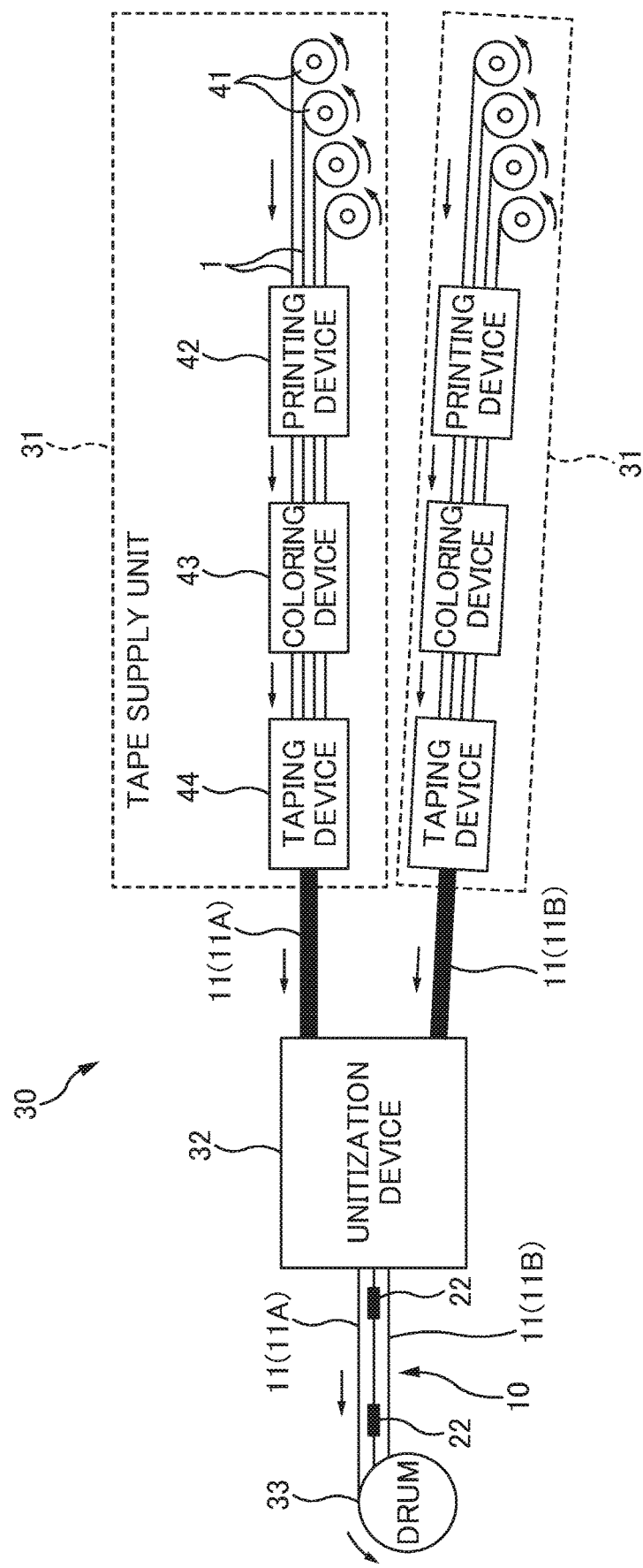
FIG. 6 is an explanatory diagram of a manufacturing system 30 for manufacturing the optical fiber unit 10.

FIG. 6 is an explanatory diagram of a manufacturing system 30 for manufacturing the optical fiber unit 10. Here, for simplification of the drawings, a method for manufacturing an eight-fiber optical fiber unit 10 formed of two four-fiber intermittently connected optical fiber ribbons 11 will be described.

The manufacturing system 30 includes two tape supply units 31, a unitization device 32, and a drum 33.

The tape supply unit 31 is a device (supply source) that supplies the intermittently connected optical fiber ribbon 11. Here, the tape supply unit 31 includes a fiber supply unit 41, a printing device 42, a coloring device 43, and a taping device 44.

The fiber supply unit 41 is a device (supply source) that supplies the optical fiber 1. Here, the fiber supply unit 41 supplies the single-core optical fiber 1 (the optical fiber 1 formed of the optical fiber part 2 and the sheath layer 3; the optical fiber 1 before the colored layer 4 is formed). However, the fiber supply unit 41 may supply a pair (the fiber pair 7: refer to FIG. 3) of two-line optical fibers 1. The fiber supply unit 41 supplies the optical fiber 1 to the printing device 42.

The printing device 42 is a device that prints a mark on the optical fiber 1. For example, the printing device 42 prints a mark indicating a tape number on each optical fiber 1. The plurality of optical fibers 1 subjected to marking by the printing device 42 are supplied to the coloring device 43.

The coloring device 43 is a device that forms the colored layer 4 of the optical fiber 1. The coloring device 43 forms the colored layer 4 of each optical fiber 1 by an identification color for identifying the optical fiber 1. Note that the identification color is a color indicating an identification number (fiber number) of the optical fiber 1. The coloring device 43 includes a coloring unit (not illustrated) for each optical fiber 1, and each coloring unit applies a coloring agent (ultraviolet curing resin) of a predetermined identification color to the surface of the optical fiber (surface of the sheath layer 3). The coloring device 43 includes an ultraviolet irradiation unit (not illustrated), and the ultraviolet irradiation unit forms the colored layer 4 by irradiating, with ultraviolet rays, the coloring agent (ultraviolet curing resin) applied to the optical fiber 1, and curing the coloring agent. The optical fiber colored by the coloring device 43 is supplied to the taping device 44. Note that the colored optical fiber 1 may be supplied from the fiber supply unit 41 to the taping device 44.

The taping device 44 is a device that intermittently forms the in-layer connection part 12, and manufactures the intermittently connected optical fiber ribbon 11. The plurality of optical fibers 1 aligned in the width direction are supplied to the taping device 44.

Figure 7A:
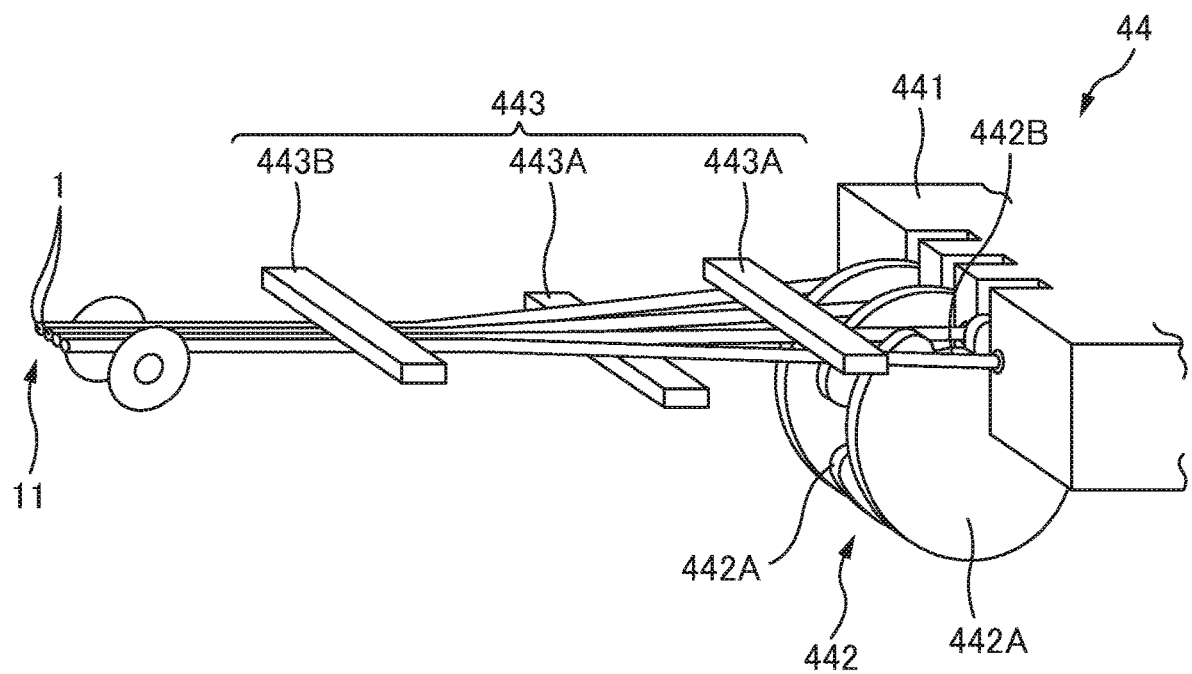
FIGS. 7A and 7B are explanatory diagrams of a taping device 44.
Figure 7B:
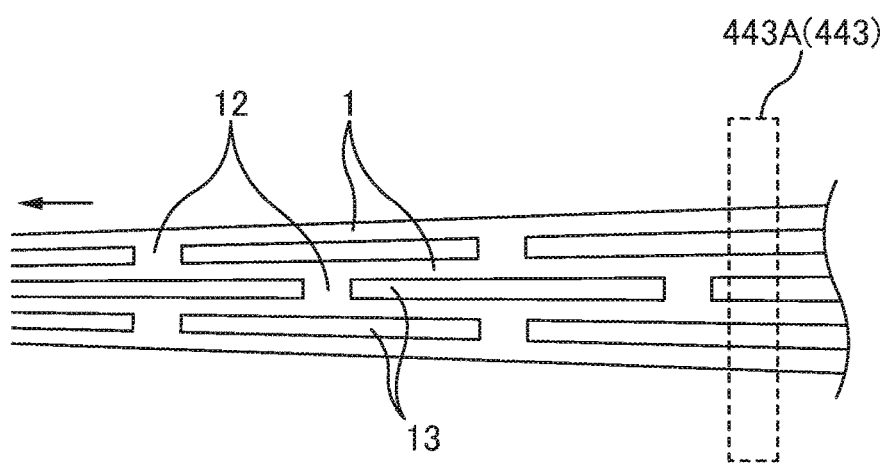

FIGS. 7A and 7B are explanatory diagrams of the taping device 44. The taping device 44 includes an application unit 441, a removal unit 442, and a light source 443.

The application unit 441 is a device that applies a connection agent (ultraviolet curing resin) that forms the in-layer connection part 12. The application unit 441 inserts the plurality of optical fibers 1 into a coating die filled with a liquid connection agent, and thus applies, in the length direction, the liquid connection agent to a periphery of the optical fiber 1 and between the optical fibers 1 adjacent to each other.

The removal unit 442 is a device that removes a part of the connection agent applied by the application unit 441 while leaving a part of the connection agent. The removal unit 442 includes a rotary blade 442A including a recessed part 442B (refer to FIG. 7A). The rotary blade 442A is arranged between two optical fibers 1, and rotates in accordance with a supply speed of the optical fibers 1. The connection agent applied by the application unit 441 is intercepted by an outer edge of the rotary blade 442A and removed, but the connection agent remains in the recessed part 442B of the rotary blade 442A. The remaining section of the connection agent becomes the in-layer connection part 12, and the removed section of the connection agent becomes the non-connected part 13.

The light source 443 is a device that irradiates, with ultraviolet rays, the connection agent formed of the ultraviolet curing resin. The light source 443 includes a temporary curing light source 443A and an actual curing light source 443B. The temporary curing light source 443A is arranged upstream of the actual curing light source 443B. The connection agent is temporarily cured by irradiation with ultraviolet rays from the temporary curing light source 443A. The temporarily cured connection agent is not completely cured, but curing proceeds on the surface. The actual curing light source 443B actually cures the connection agent by irradiation with ultraviolet rays stronger than those of the temporary curing light source 443A. The actually cured ultraviolet curing resin is cured to the inside (however, the in-layer connection part 12 after actual curing has moderate elasticity).

As illustrated in FIG. 7B, the optical fibers 1 immediately after leaving the application unit 441 and the removal unit 442 have an interval therebetween. In this state, the temporary curing light source 443A temporarily cures the connection agent by irradiating the connection agent with ultraviolet rays. The taping device 44 gradually narrows an interval between the optical fibers after temporary curing of the connection agent, and arranges the plurality of optical fibers 1 side by side and gathers them into a tape shape. Note that, since the connection agent is temporarily cured, even if the removed parts (non-connected parts 13) of the connection agent contact each other, the removed parts are not connected to each other. Since it is before actual curing, an interval between the optical fibers 1 can also be narrowed (gathered) in a region in which the optical fibers 1 are connected by the connection agent. When the connection agent is actually cured by irradiation with ultraviolet rays by the actual curing light source 443B, the intermittently connected optical fiber ribbon 11 illustrated in FIG. 2 is manufactured.

The tape supply unit 31 (taping device 44) supplies the manufactured intermittently connected optical fiber ribbon 11 to the unitization device 32. Note that the tape supply unit 31 may supply, to the unitization device 32, the intermittently connected optical fiber ribbon 11 from a drum around which the intermittently connected optical fiber ribbon 11 is wound.

The unitization device 32 is a device that intermittently forms the interlayer connection part 22, and manufactures the optical fiber unit 10. The two intermittently connected optical fiber ribbons 11 overlapping each other are supplied to the unitization device 32.

Figure 8A:
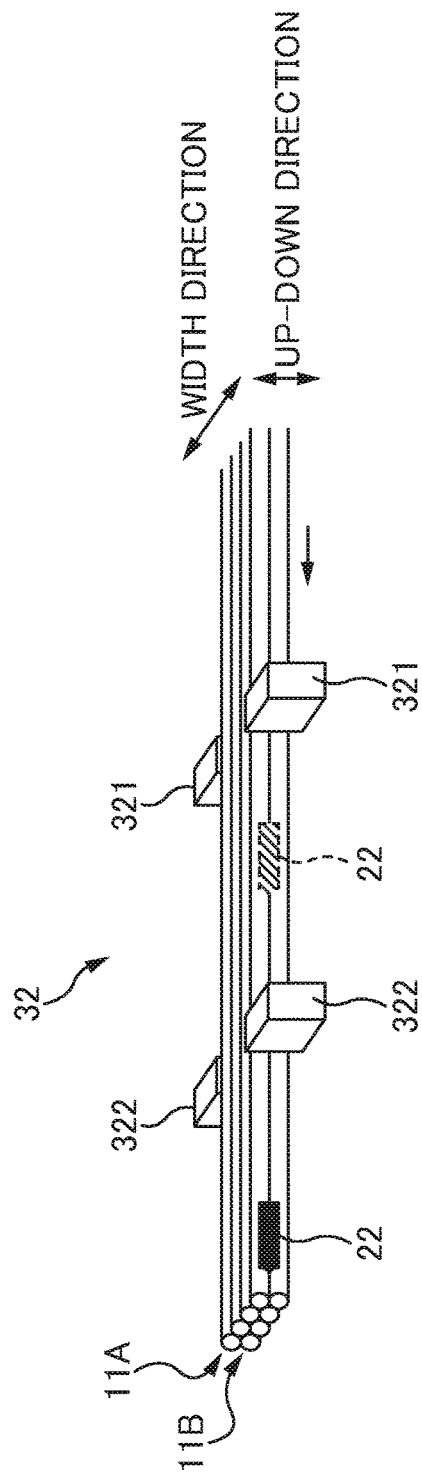
FIG. 8A is an explanatory diagram of a unitization device 32.

FIG. 8A is an explanatory diagram of the unitization device 32. The unitization device 32 includes an application unit 321 and a light source 322.

The application unit 321 is a device that applies a connection agent (ultraviolet curing resin) that forms the interlayer connection part 22. The application unit 321 applies the connection agent that forms the interlayer connection part 22 between two optical fibers 1 adjacent to each other in the up-down direction in the end part in the width direction. Here, the application unit 321 is formed of a head that discharges the connection agent. In other words, the application unit 321 applies the connection agent by an ink-jet printing method. The head includes a nozzle row (not illustrated) in which a plurality of nozzles (not illustrated) are aligned in the up-down direction. A discharge surface (a surface in which the nozzle row is formed) of the head is arranged so as to face the two optical fibers 1 adjacent to each other in the up-down direction in the end part in the width direction. The connection agent is applied between the two optical fibers 1 by discharging the connection agent from the nozzles.

Figure 8B:
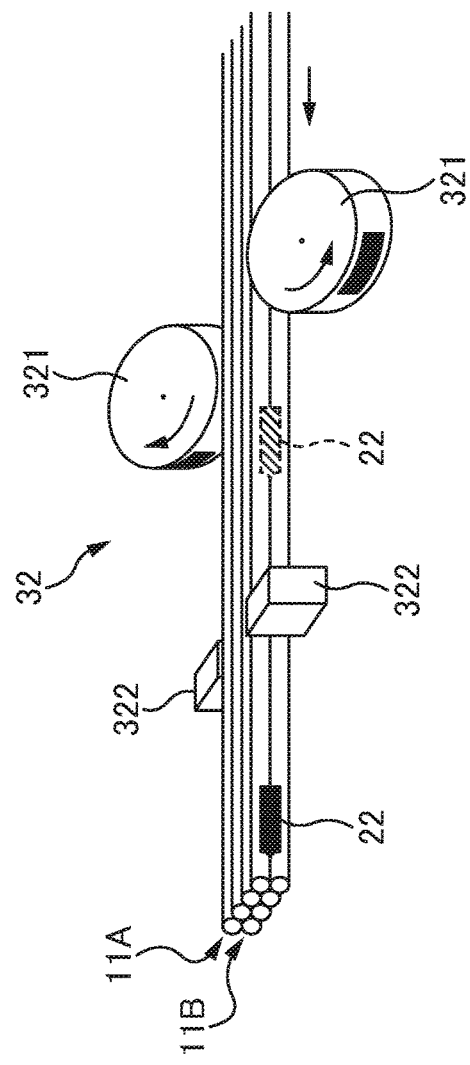
FIG. 8B is an explanatory diagram of another application unit 321.

FIG. 8B is an explanatory diagram of another application unit 321. The application unit 321 is formed of a printing roller. In other words, the application unit 321 applies the connection agent by a roll printing method. Note that the application unit 321 includes, in addition to the printing roller, a liquid tank (not illustrated) that houses the connection agent, a supply roller (not illustrated) that scrapes up the connection agent from the liquid tank and supplies the connection agent to the printing roller, a doctor blade (not illustrated), and the like. A streak part is formed on a surface of the printing roller by a mesh pattern. The ultraviolet curing resin adheres to the streak part on the surface of the printing roller (the ultraviolet curing resin fills in a recessed part (cell) in a printing plate), and the ultraviolet curing resin adhering to the streak part is transferred between the two optical fibers 1 adjacent to each other in the up-down direction in the end part in the width direction.

The light source 322 is a device that irradiates, with ultraviolet rays, the connection agent formed of the ultraviolet curing resin. The light source 322 forms the interlayer connection part 22 by irradiating the connection agent applied by the application unit 321 with ultraviolet rays, and curing the connection agent.

The unitization device 32 forms the interlayer connection part 22, and thus the optical fiber unit 10 according to one or more embodiments is manufactured. The optical fiber unit 10 manufactured by the unitization device 32 is supplied to the drum 33.

The drum 33 is a member for winding the optical fiber unit 10. In one or more embodiments, the non-connected part 13 is formed on the intermittently connected optical fiber ribbon 11, and the interlayer separation part 23 is also formed between the two optical fiber ribbons 11 of the optical fiber unit 10. Accordingly, the optical fibers 1 are not firmly restrained and a movement of the optical fiber 1 in a cross section is allowed, and thus the optical fiber unit 10 is easily wound around the drum 33.

Figure 9:
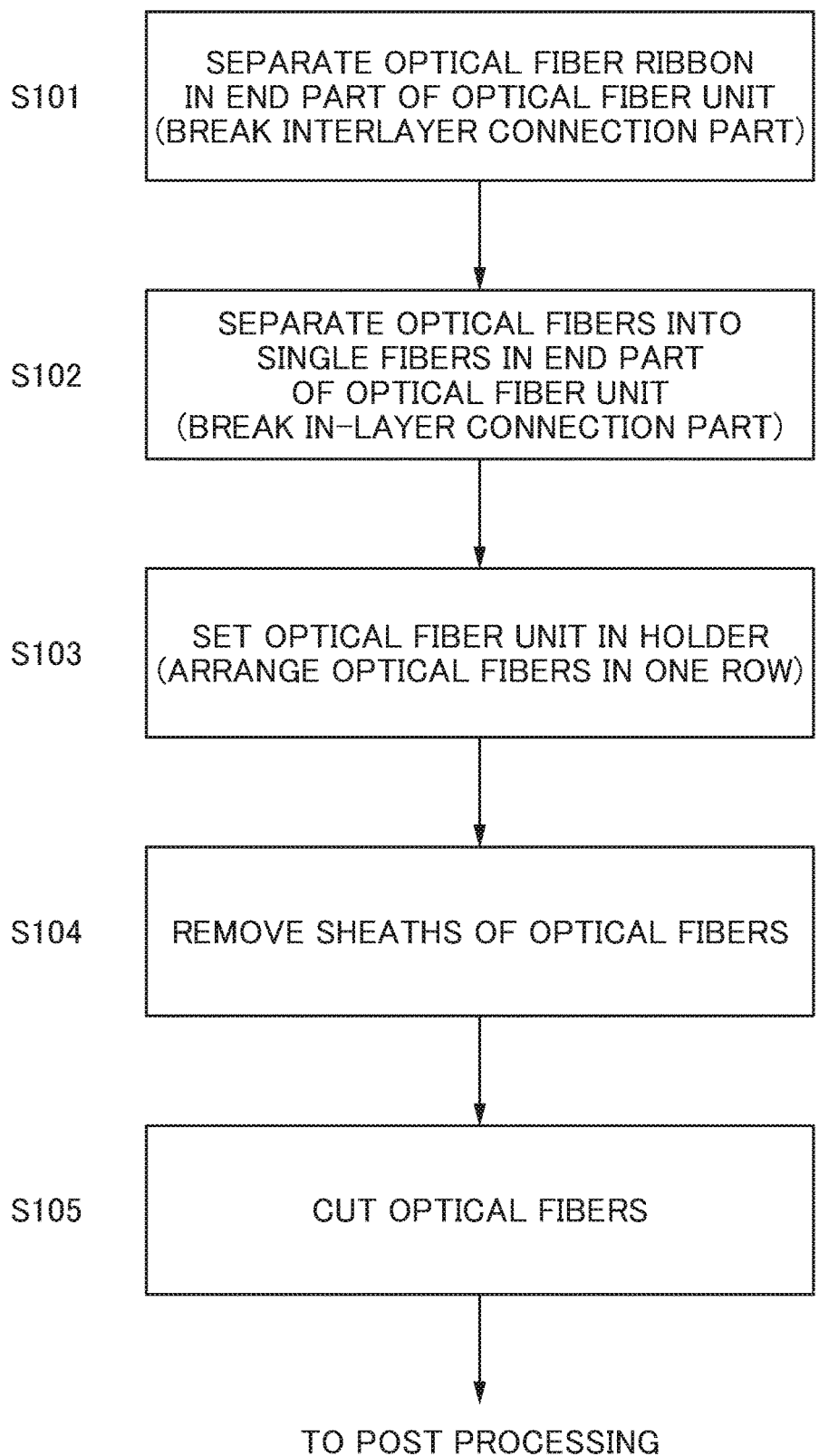
FIG. 9 is a flowchart of an example of a machining method for the optical fiber unit 10.

Machining Method for Optical Fiber Unit 10 FIG. 9 is a flowchart of an example of a machining method for the optical fiber unit 10.

First, an operator breaks the interlayer connection part 22 in the end part of the optical fiber unit 10, and separates the optical fiber ribbon 11 (S101). For example, as illustrated in FIG. 5B, the operator applies force in the length direction to the optical fiber unit 10 so as to reduce the interval P2 between the interlayer connection parts 22, and opens up the interlayer separation part 23 of the first tape 11A and the second tape 11B. Then, the operator inserts a finger or a division tool into the widened interlayer separation part 23, slides the inserted finger or the inserted division tool in the length direction, and thus breaks (cuts) the interlayer connection part 22. In this way, the first tape 11A and the second tape 11B are separated.

Next, the operator separates the optical fibers 1 into single fibers in the end part of the optical fiber unit 10 (S102). In other words, the operator separates, into single fibers, the optical fibers 1 of the first tape 11A separated in S101, and also separates the optical fibers 1 of the second tape 11B into single fibers. Note that the work is similar to work for separating the optical fibers 1 of the normal intermittently connected optical fiber ribbon 11 into single fibers.

Figure 10A:
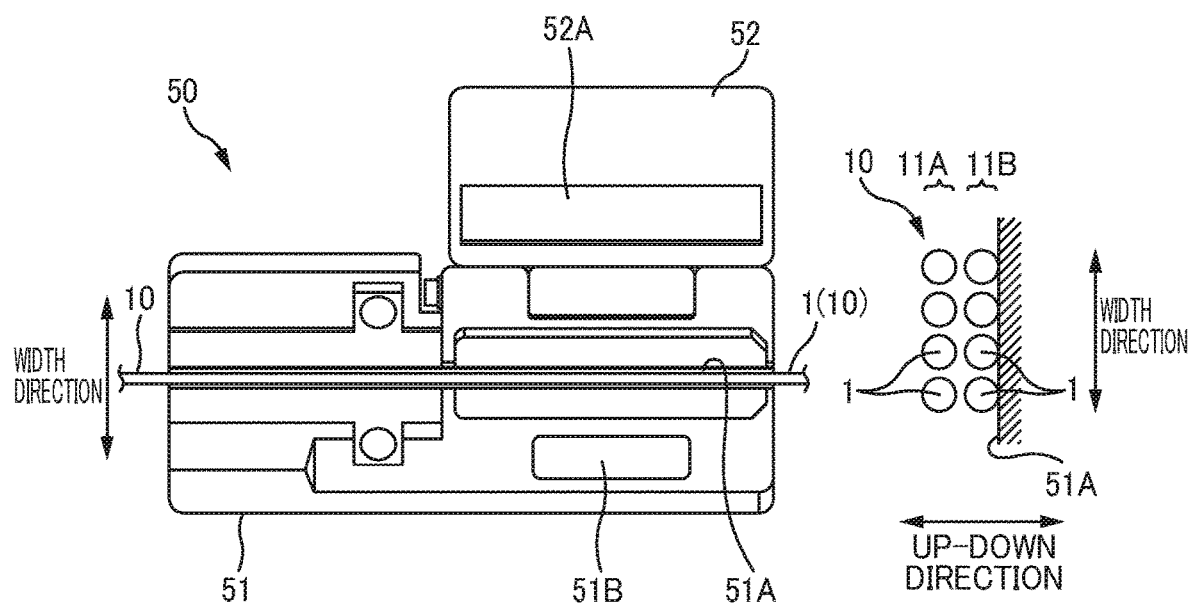
FIGS. 10A and 10B are explanatory diagrams of a situation where the optical fiber unit 10 is set in a holder 50.
Figure 10B:
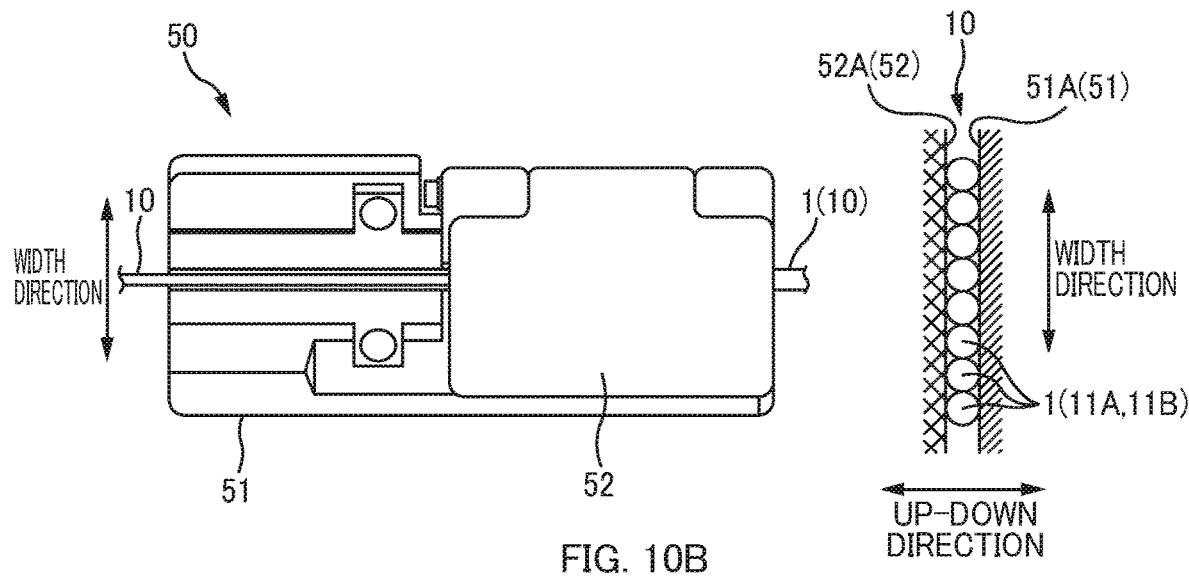

Next, the operator sets the optical fiber unit 10 in a holder 50 (S103). FIGS. 10A and 10B are explanatory diagrams of a situation where the optical fiber unit 10 is set in the holder 50. A state of the optical fibers 1 on a placement surface 51A of the holder 50 is illustrated on the right side of each of the diagrams.

As illustrated in FIGS. 10A and 10B, the holder 50 includes a base part 51 and a lid part 52. The base part 51 is a member for placing the optical fibers 1. Note that the base part 51 may include a guide hole into which a guide pin of a fusion splicing machine (not illustrated) is inserted. The lid part 52 is a member that can be open and closed with respect to the base part 51. The lid part is open and closed with respect to the base part 51 with, as a shaft, a hinge part formed between the base part 51 and the lid part 52. The base part 51 includes a magnet 51B, and the lid part 52 is fixed by the magnet 51B when the lid part 52 is closed. The lid part 52 includes a press part 52A, and the plurality of optical fibers 1 of the optical fiber unit 10 are sandwiched between the placement surface 51A of the base part 51 and the press part 52A when the lid part 52 is closed.

In one or more embodiments, as illustrated in FIG. 10B, when the plurality of optical fibers 1 of the optical fiber unit 10 are sandwiched between the placement surface 51A of the base part 51 and the press part 52A of the lid part 52 with the lid part 52 closed, the optical fiber 1 of the first tape 11A enters between the optical fibers 1 of the second tape 11B (or the optical fiber 1 of the second tape 11B enters between the optical fibers 1 of the first tape 11A), and the plurality of layered and arranged optical fibers 1 of the optical fiber unit 10 are arranged in one row on the placement surface 51A. In this way, it is possible to machine the plurality of layered and arranged optical fibers 1 of the optical fiber unit 10 by using a normal tool (for example, a sheath removing device and a cutting device: refer to S104 and S105 described later).

Note that, since the plurality of optical fibers 1 of the optical fiber unit 10 are arranged in one row on the placement surface 51A in such a manner, it is preferable that the optical fibers 1 sandwiched between the placement surface 51A and the press part 52A are separated into single fibers. In other words, it is preferable that the interlayer connection part 22 is broken in a section sandwiched between the placement surface 51A and the press part 52A in S101 described above, and the in-layer connection part 12 is broken in the section sandwiched between the placement surface 51A and the press part 52A in S102. Note that, if the interlayer connection part 22 and the in-layer connection part 12 remain in the section sandwiched between the placement surface 51A and the press part 52A, it is difficult for the optical fiber 1 of the first tape 11A to enter between the optical fibers 1 of the second tape 11B, and thus it is difficult to arrange the plurality of layered and arranged optical fibers 1 of the optical fiber unit 10 in one row on the placement surface 51A. In contrast, in one or more embodiments, the interlayer connection part 22 and the in-layer connection part 12 in the section sandwiched between the placement surface 51A and the press part 52A are broken, and all the optical fibers 1 in the section sandwiched between the placement surface 51A and the press part 52A are separated into single fibers. Thus, when the plurality of optical fibers 1 of the optical fiber unit 10 are sandwiched between the placement surface 51A of the base part 51 and the press part 52A of the lid part 52, the plurality of layered and arranged optical fibers 1 of the optical fiber unit 10 can be arranged in one row on the placement surface 51A.

Figure 11A:
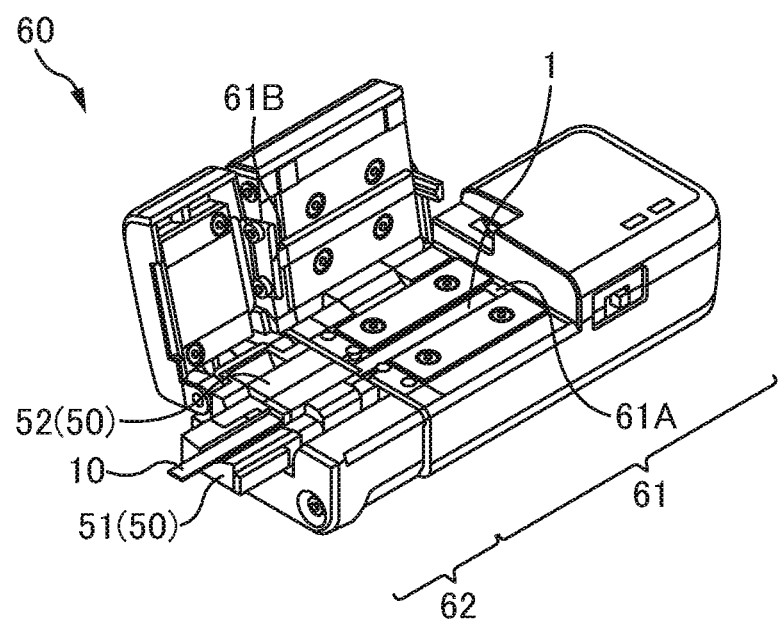
FIGS. 11A to 11C are explanatory diagrams of a situation where sheaths of optical fibers 1 of the optical fiber unit 10 are removed.
Figure 11B:
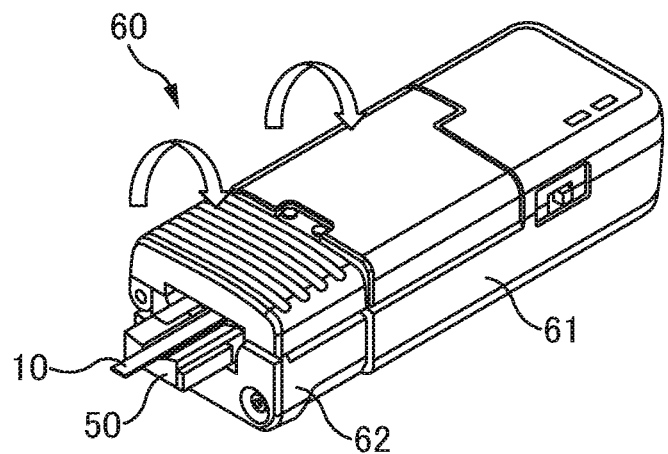
Figure 11C:
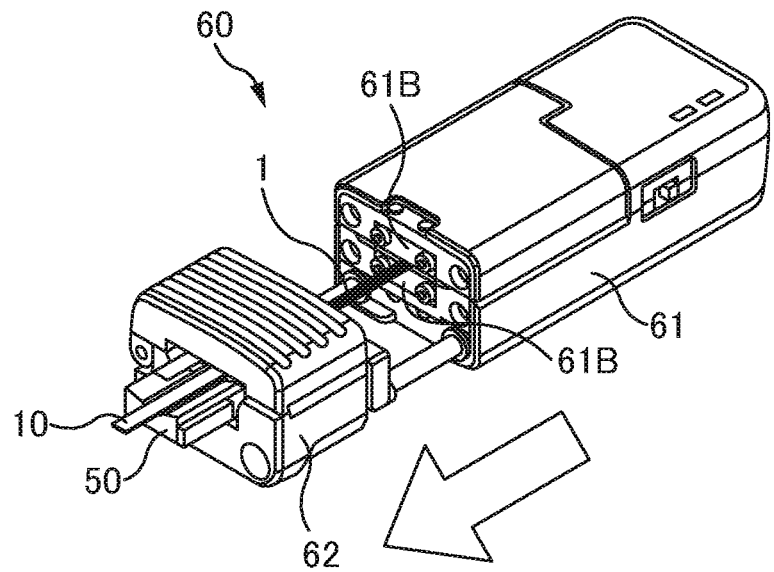

Next, the operator removes sheaths of the optical fibers 1 of the optical fiber unit 10 (S104). FIGS. 11A to 11C are explanatory diagrams of a situation where sheaths of the optical fibers 1 of the optical fiber unit 10 are removed.

As illustrated in FIG. 11A, the operator sets the holder 50 that holds the optical fiber unit 10 in a holder stand of a holding part 62 of a sheath removing device 60 (hot jacket stripper). As already described, the optical fiber unit 10 with the plurality of optical fibers 1 arranged in one row is set in the holder 50. Thus, when the operator sets the holder 50 in the holder stand, the plurality of optical fibers 1 extending from the holder 50 are aligned and placed in one row in the width direction on a heating surface 61A of a body part 61 of the sheath removing device 60. Thus, both of the optical fibers 1 of the first tape 11A and the optical fibers 1 of the second tape 11B can be heated by the same heating surface 61A.

Next, as illustrated in FIG. 11B, the operator closes a lid of the body part 61 and a lid of the holding part 62. When the lid of the body part 61 is closed, the plurality of optical fibers 1 (the optical fibers 1 of the first tape 11A and the second tape 11B arranged in one row) extending from the holder 50 are sandwiched between a pair of blades 61B (refer to FIG. 11C), and a cut is put in sheaths of the optical fibers 1 by the pair of blades 61B. In one or more embodiments, since the optical fibers 1 of the optical fiber unit 10 are aligned in one row in the width direction, a cut is put in both of sheaths of the optical fibers 1 of the first tape 11A and sheaths of the optical fibers 1 of the second tape 11B by the pair of blades 61B. Note that, when the lid of the body part 61 is closed, sheaths in the end part of the optical fibers 1 are heated by the heating surface 61A. When the sheaths in the end part of the optical fibers 1 are heated, the sheaths become soft and become easy to remove.

Next, as illustrated in FIG. 11C, the operator moves the holding part 62 rearward with respect to the body part 61 with the lid closed, and separates the body part 61 and the holding part 62. In this way, the sheaths in the end part of the optical fibers 1 are pulled by the pair of blades 61B, and the sheaths of the optical fibers 1 are removed. In one or more embodiments, since the optical fibers 1 of the optical fiber unit 10 are aligned in one row in the width direction, both of the sheaths of the optical fibers 1 of the first tape 11A and the sheaths of the optical fibers 1 of the second tape 11B can be removed together by the pair of blades 61B. In one or more embodiments, since the sheaths of the optical fibers 1 of the first tape 11A and the second tape 11B are removed by the same blades 61B, peeling edges of the sheaths can be lined up.

Next, the operator cuts the optical fibers 1 of the optical fiber unit 10. The operator sets the holder 50 that holds the optical fiber unit 10 in a cutting device (not illustrated). As already described, the optical fiber unit 10 with the plurality of optical fibers 1 arranged in one row is set in the holder 50. The optical fibers 1 having the sheaths removed in S104 extend from the holder 50. Then, the operator puts an initial scratch in the optical fibers 1 (optical fibers 1 having the sheaths removed) aligned in one row in the width direction by moving a cutting blade in the width direction, and also cuts the optical fibers 1 by rupturing (cleaving) the optical fibers 1 from the initial scratch. In this way, both of the optical fibers 1 of the first tape 11A and the optical fibers 1 of the second tape 11B of the optical fiber unit 10 can be cut together. Since the optical fibers 1 are cut by the same cutting blade, endfaces of the optical fibers 1 can line up.

The prior processing of the optical fibers 1 is completed by the machining processing in S101 to S105 described above. The plurality of optical fibers 1 of the optical fiber unit 10 according to one or more embodiments are layered and arranged, but sheaths can be removed in the same position and the optical fibers 1 can be cut in the same position by setting the optical fiber unit 10 in the holder 50 and arranging the optical fibers 1 in one row.

After the prior processing, the operator performs post processing. As the post processing, a ferrule may be attached, and fusion splicing of the optical fibers 1 may be performed. For example, when a ferrule in which fiber holes are formed in many stages is attached, the plurality of optical fibers 1 of the optical fiber unit 10 according to one or more embodiments can be inserted together into each of the fiber holes of the ferrule. When the optical fibers 1 are fusion-spliced, the holder 50 that holds the optical fiber unit 10 is set in a fusion splicing machine (not illustrated), and the plurality of optical fibers 1 of the optical fiber unit 10 can be fusion-spliced together. In this case, when the optical fiber unit 10 is set in the holder 50, the optical fibers 1 of the first tape 11A and the optical fibers 1 of the second tape 11B need to be arranged in one row in a predetermined order. Thus, when the optical fiber unit 10 is set in the holder 50, it is preferable that the optical fibers 1 of the first tape 11A and the optical fibers 1 of the second tape 11B are alternately arranged in one row.

Modification Example

Figure 12A:
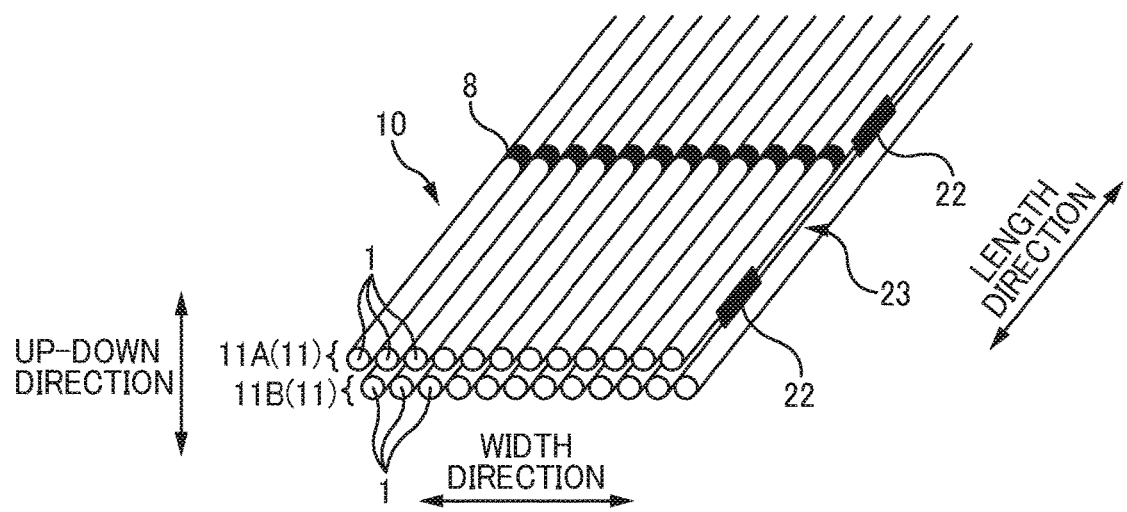
FIGS. 12A to 12C are explanatory diagrams of the optical fiber unit 10 according to a modification example of one or more embodiments.
Figure 12B:
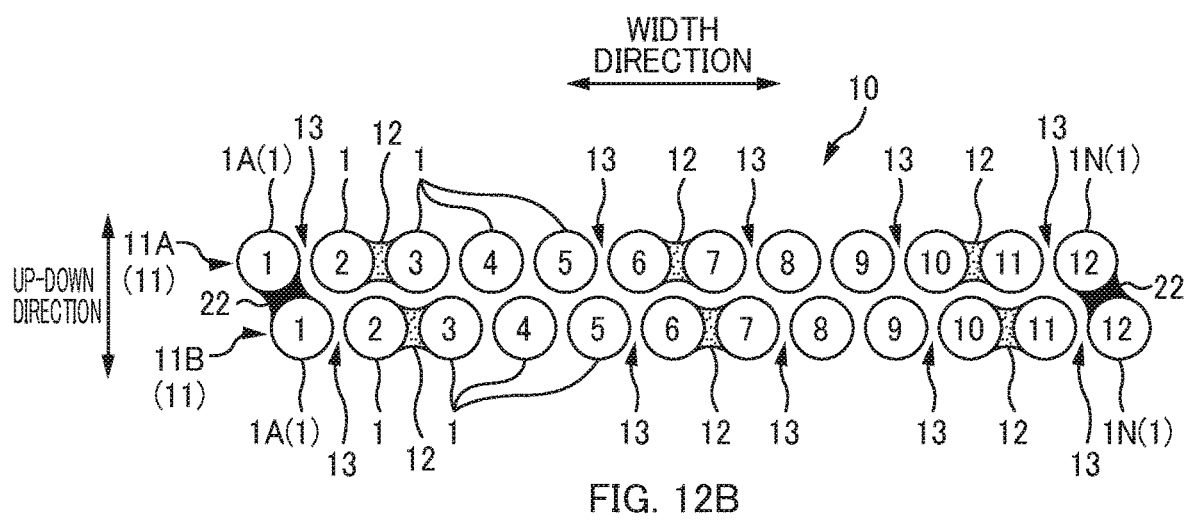
Figure 12C:
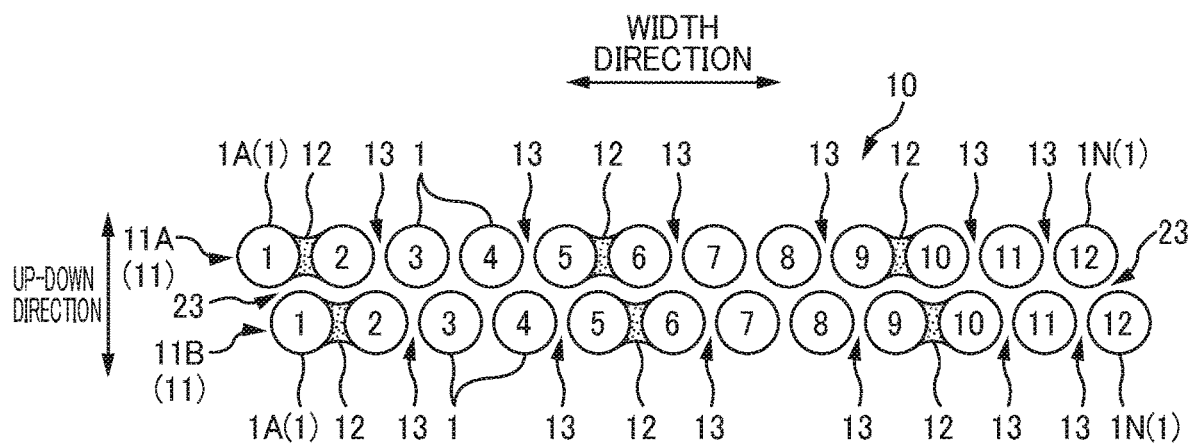

FIG. 12A is an explanatory diagram of the optical fiber unit 10 according to a modification example of one or more embodiments. FIG. 12B is a cross-sectional view in a position including the interlayer connection part 22. FIG. 12C is a cross-sectional view in a position that does not include the interlayer connection part 22. As illustrated in FIG. 12A, a mark 8 indicating a first tape is formed on the first tape 11A. Note that, although not illustrated in FIG. 12A, a mark 8 indicating a second tape is formed on the second tape 11B on a lower side.

In the optical fiber unit 10 according to the modification example, the optical fibers 1 having the same fiber number of the first tape 11A and the second tape 11B are aligned in the up-down direction in a slightly shifted state in the width direction (specifically, in a shifted state by about half of a fiber interval in the width direction). In this way, the optical fibers 1 having the same fiber number being aligned in the up-down direction may not be located in the same position in the width direction, and may be slightly shifted in the width direction. However, in one or more embodiments, the optical fibers 1 having the same fiber number of the first tape 11A and the second tape 11B are aligned in the up-down direction, and thus a shift amount in the width direction of the optical fibers 1 having the same fiber number is less than a fiber interval.

Figure 13:
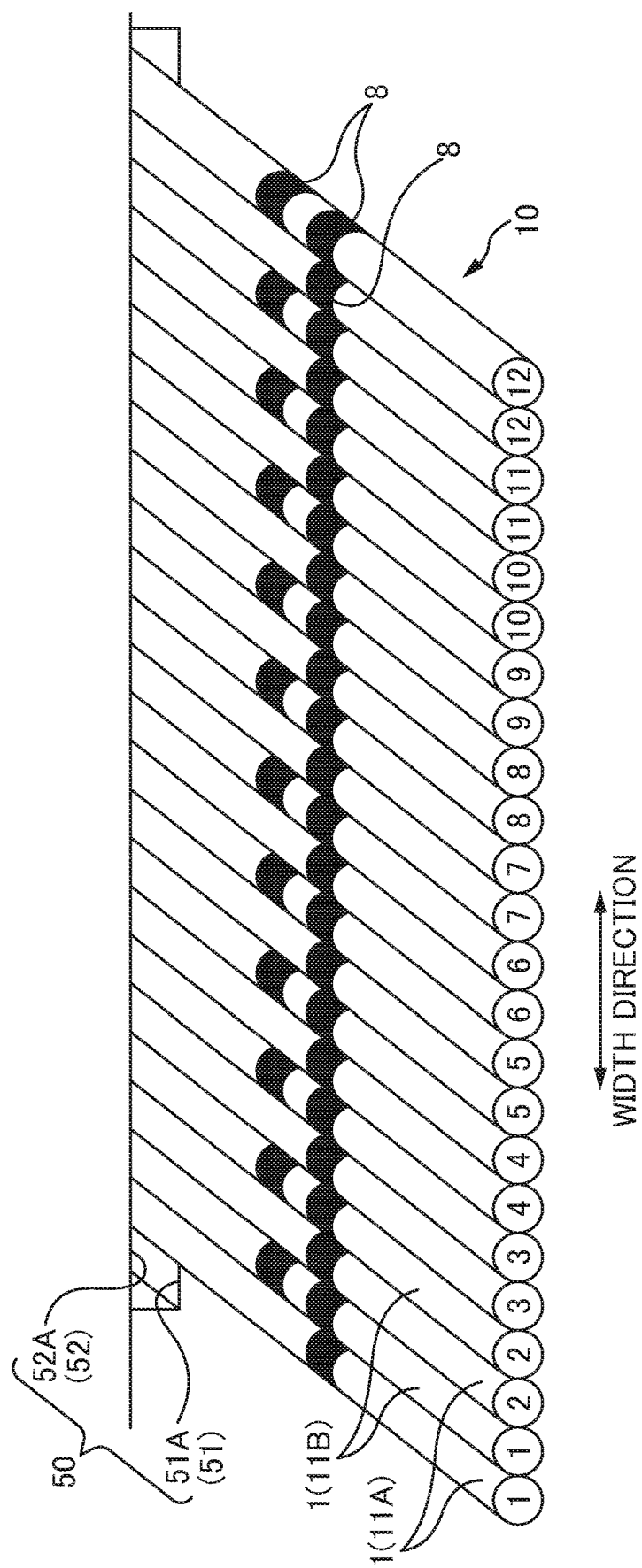
FIG. 13 is an explanatory diagram of a situation where the optical fiber unit 10 according to the modification example illustrated in FIG. 12A is set in the holder 50.

FIG. 13 is an explanatory diagram of a situation where the optical fiber unit 10 according to the modification example illustrated in FIG. 12A is set in the holder 50. As already described, when the optical fiber unit 10 is sandwiched between the placement surface 51A of the base part 51 and the press part 52A of the lid part 52, the plurality of layered and arranged optical fibers 1 of the optical fiber unit 10 are arranged in one row on the placement surface 51A.

In the optical fiber unit 10 according to the modification example, the optical fibers 1 having the same fiber number are aligned in the up-down direction while being slightly shifted in the width direction, and thus the optical fibers 1 of the first tape 11A and the optical fibers 1 of the second tape 11B are alternately aligned in one row when the optical fiber unit 10 is sandwiched between the placement surface 51A of the base part 51 and the press part 52A of the lid part 52. In other words, according to the modification example, when the optical fiber unit 10 is set in the holder 50, the optical fibers 1 of the first tape 11A and the optical fibers 1 of the second tape 11B can be arranged in one row in a predetermined order.

Whether the plurality of optical fibers set in the holder 50 are arranged in a predetermined order is difficult to determine only by an identification color of the optical fibers 1. Thus, according to the modification example, it is preferable that the mark 8 indicating a tape number is formed on each optical fiber ribbon of the optical fiber unit 10. In this way, as illustrated in FIG. 13, whether the optical fibers 1 of the first tape 11A and the optical fibers 1 of the second tape 11B are alternately aligned can be determined based on the mark 8 of the optical fibers 1 set in the holder 50 and aligned in one row. Note that determination based on the mark 8 of the optical fibers 1 aligned in one row may be performed by visual confirmation by an operator. However, a machining machine (such as a sheath removing device, a cutting device, and a fusion splicing machine) may include a function of identifying the mark 8, and the machining machine may determine whether the optical fibers 1 of the first tape 11A and the optical fibers 1 of the second tape 11B are alternately aligned, based on the mark 8 of the optical fibers 1 aligned in one row.

Figure 14A:
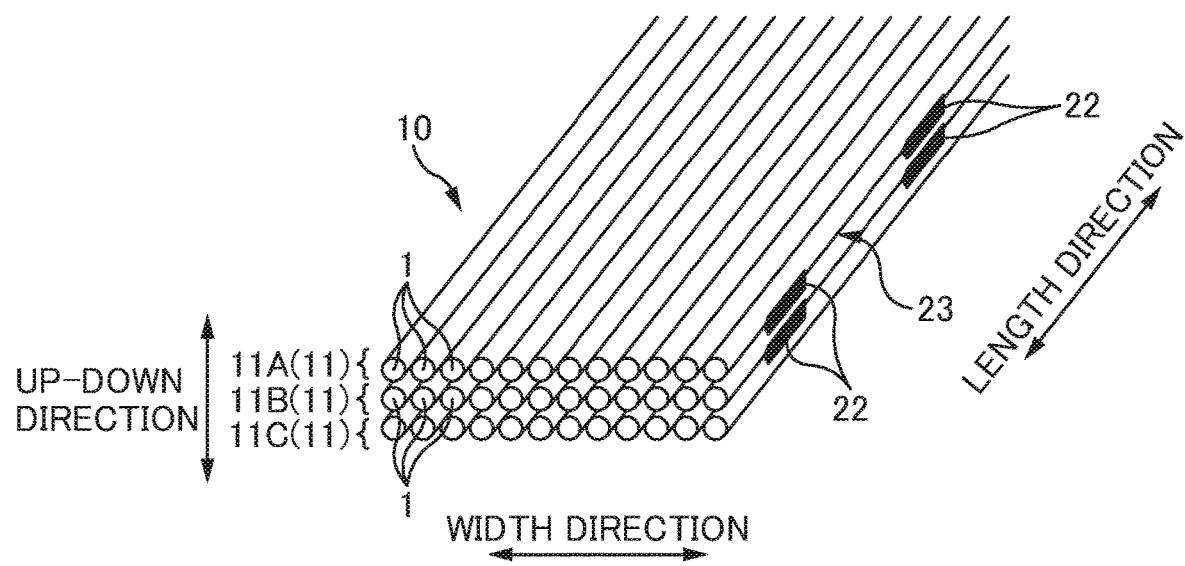
FIGS. 14A and 14B are explanatory diagrams of an optical fiber unit 10 according to one or more embodiments.
Figure 14B:
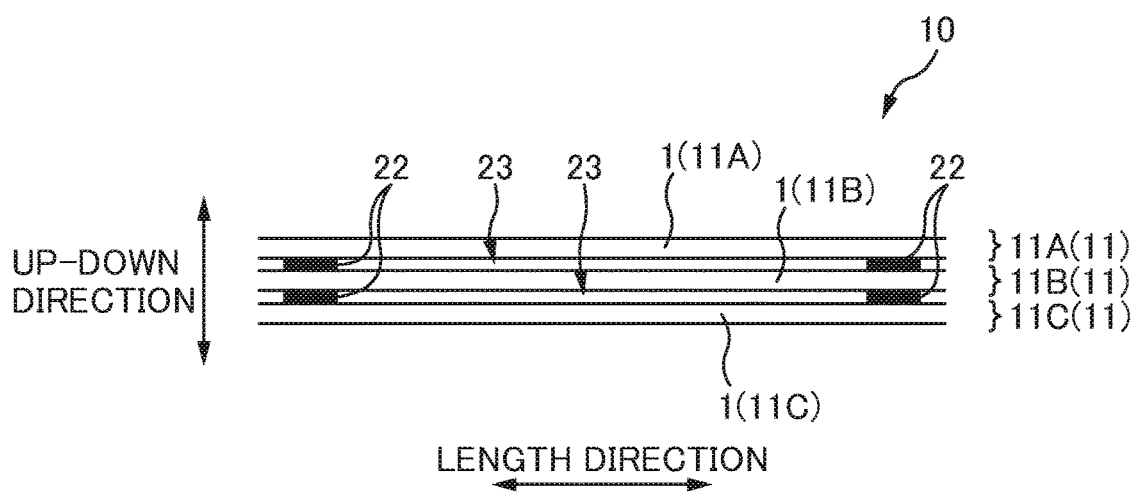

FIGS. 14A and 14B are explanatory diagrams of an optical fiber unit 10 according to one or more embodiments.

The optical fiber unit 10 according to one or more embodiments includes three intermittently connected optical fiber ribbons 11 (a first tape 11A, a second tape 11B, and a third tape 11C). Also in one or more embodiments, the three intermittently connected optical fiber ribbons 11 are aligned and layered in the up-down direction such that optical fibers 1 having the same fiber number are aligned in the up-down direction. In the optical fiber unit 10 according to one or more embodiments, the first tape 11A and the second tape 11B are intermittently connected by an interlayer connection part 22 in the length direction, and the second tape 11B and the third tape 11C are also intermittently connected by the interlayer connection part 22 in the length direction. In this way, the intermittently connected optical fiber ribbon 11 constituting the optical fiber unit 10 is not limited to two, and may be three or more.

As illustrated in FIG. 14B, the interlayer connection part 22 that connects the first tape 11A and the second tape 11B and the interlayer connection part 22 that connects the second tape 11B and the third tape 11C are formed in the same position in the length direction. In this way, since the two interlayer connection parts 22 are aligned in the up-down direction, the two interlayer connection parts 22 can be formed by a simple method. For example, when the two interlayer connection parts 22 are aligned in the up-down direction and formed, the roll printing method (refer to FIG. 8B) described above can be adopted.

Figure 15A:
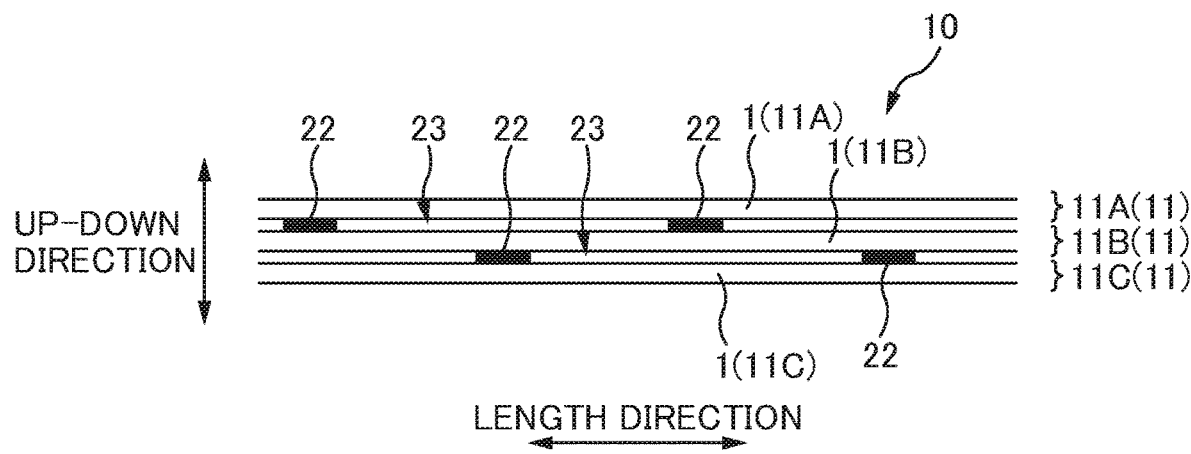
FIGS. 15A and 15B are explanatory diagrams of an optical fiber unit 10 according to a modification example.
Figure 15B:
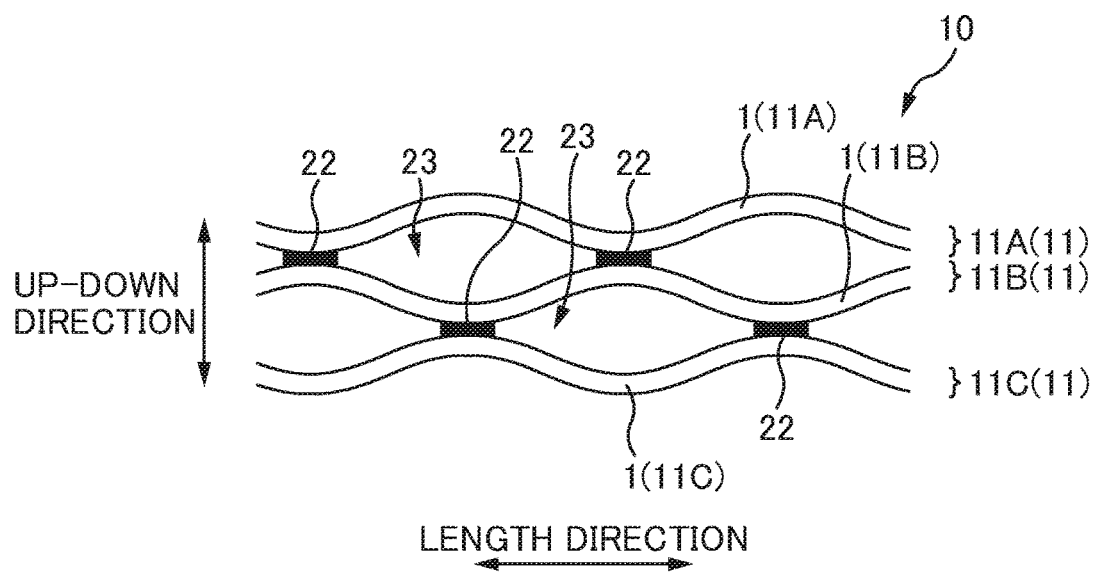

FIGS. 15A and 15B are explanatory diagrams of the optical fiber unit 10 according to a modification example of one or more embodiments.

In the modification example, the interlayer connection part 22 that connects the first tape 11A and the second tape 11B and the interlayer connection part 22 that connects the second tape 11B and the third tape 11C are formed in different positions in the length direction. In this way, it is possible to perform an arrangement such that a position in the length direction of an interlayer separation part 23 of the first tape 11A and the second tape 11B is shifted with respect to a position in the length direction of the interlayer separation part 23 of the second tape 11B and the third tape 11C. As a result, in the modification example, as illustrated in FIG. 15B, when force in the length direction is applied to the optical fiber unit 10 so as to reduce an interval between the interlayer connection parts 22, a position in which the interlayer separation part 23 of the first tape 11A and the second tape 11B is opened up is shifted with respect to a position in which the interlayer separation part 23 of the first tape 11A and the second tape 11B is opened up, and thus work for taking out a desired optical fiber ribbon 11 from the optical fiber unit 10 is facilitated.

Note that, when the interlayer connection part 22 is formed as in the modification example, it is preferable to adopt the ink-jet printing method (refer to FIG. 8A) described above.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical fiber;
1A: First fiber;
1N: Twelfth fiber;
2: Optical fiber part;
3: Sheath layer;
4: Colored layer;
5: First adhesive layer;
7: Fiber pair;
8: Mark;
10: Optical fiber unit;
11: Optical fiber ribbon;
11A: First tape;
11B: Second tape;
12: In-layer connection part;
13: Non-connected part;
22: Interlayer connection part;
23: Interlayer separation part;
30: Manufacturing system;
31: Tape supply unit;
32: Unitization device;
321: Application unit;
322: Light source;
33: Drum;
41: Fiber supply unit;
42: Printing device;
43: Coloring device;
44: Taping device;
441: Application unit;
442: Removal unit;
442A: Rotary blade;
442B: Recessed part;
443: Light source;
443A: Temporary curing light source;
443B: Actual curing light source;
50: Holder;
51: Base part;
51A: Placement surface;
51B: Magnet;
52: Lid part;
52A: Press part;
60: Sheath removing device;
61: Body part;
61A: Heating surface;
61B: Blade;
62: Holding part.

The invention claimed is:

1. An optical fiber unit, comprising:
a first optical fiber ribbon that intermittently connects a first plurality of optical fibers;
a second optical fiber ribbon that intermittently connects a second plurality of optical fibers; and
interlayer connection parts that intermittently connect the first optical fiber ribbon and the second optical fiber ribbon in a length direction while the first optical fiber ribbon and the second optical fiber ribbon are layered and arranged, wherein
the interlayer connection parts are disposed on a layer of a connection agent constituting in-layer connection parts that intermittently connect the optical fibers of the first optical fiber ribbon or the second optical fiber ribbon.

2. The optical fiber unit according to claim 1, wherein the optical fiber in an end part of the first optical fiber ribbon and the optical fiber in an end part of the second optical fiber ribbon are connected by the interlayer connection parts.

3. The optical fiber unit according to claim 2, wherein each of the first optical fiber ribbon and the second optical fiber ribbon is configured with N optical fibers, and the interlayer connection parts that connect the first optical fiber in the first optical fiber ribbon to the first optical fiber in the second optical fiber ribbon and the interlayer connection parts that connect the N-th optical fiber in the first optical fiber ribbon to the N-th optical fiber in the second optical fiber ribbon are disposed in a same position in the length direction.

4. The optical fiber unit according to claim 2, wherein each of the first optical fiber ribbon and the second optical fiber ribbon is configured with N optical fibers, and the interlayer connection parts that connect the first optical fiber in the first optical fiber ribbon to the first optical fiber in the second optical fiber ribbon and the interlayer connection parts that connect the N-th optical fiber in the first optical fiber ribbon to the N-th optical fiber in the second optical fiber ribbon are disposed in different positions from each other in the length direction.

5. The optical fiber unit according to claim 1, wherein,
P1 is an interval in which in-layer connection parts that each intermittently connects the optical fibers of the first optical fiber ribbon or the second optical fiber ribbon are aligned in the length direction,
P2 is an interval in which the interlayer connection parts are aligned in the length direction, and
P2 is longer than P1.

6. The optical fiber unit according to claim 1, wherein,
A1 is a length in the length direction of an in-layer connection part that intermittently connects the optical fibers of the first optical fiber ribbon or the second optical fiber ribbon,
A2 is a length in the length direction of the interlayer connection part, and
A2 is shorter than A1.

7. An optical fiber unit, comprising:
a first optical fiber ribbon that intermittently connects a first plurality of optical fibers;
a second optical fiber ribbon that intermittently connects a second plurality of optical fibers; and interlayer connection parts that intermittently connect the first optical fiber ribbon and the second optical fiber ribbon in a length direction while the first optical fiber ribbon and the second optical fiber ribbon are layered and arranged, wherein the first optical fiber ribbon and the second optical fiber ribbon are layered and arranged such that optical fibers having a same fiber number of the first optical fiber ribbon and the second optical fiber ribbon are aligned in an up-down direction perpendicular to the length direction, and the interlayer connection parts are disposed on a layer of a connection agent constituting in-layer connection parts that intermittently connect the optical fibers of the first optical fiber ribbon or the second optical fiber ribbon.

8. The optical fiber unit according to claim 1, wherein in-layer connection parts that intermittently connect the optical fibers of the first optical fiber ribbon or the second optical fiber ribbon are not disposed in a section in which the interlayer connection parts of the optical fibers are disposed.

9. The optical fiber unit according to claim 1, further comprising:

a third optical fiber ribbon that intermittently connects a third plurality of optical fibers.

10. The optical fiber unit according to claim 9, wherein interlayer connection parts that intermittently connect the first optical fiber ribbon and the second optical fiber ribbon in the length direction and interlayer connection parts that intermittently connect the second optical fiber ribbon and the third optical fiber ribbon in the length direction are disposed in different positions from each other in the length direction.

11. The optical fiber unit according to claim 1, wherein, each of the first optical fiber ribbon and the second optical fiber ribbon has in-layer connection parts that intermittently connect adjacent optical fibers to each other, and non-connected parts located between the in-layer connection parts arranged in the length direction, and the in-layer connection parts and the non-connected parts are aligned in a width direction perpendicular to the length direction and the up-down direction.

12. The optical fiber unit according to claim 9, wherein interlayer connection parts that intermittently connect the first optical fiber ribbon and the second optical fiber ribbon in the length direction and interlayer connection parts that intermittently connect the second optical fiber ribbon and the third optical fiber ribbon in the length direction are formed in a same position in the length direction.

* * * * *